(12) United States Patent
Gulati et al.

(10) Patent No.: US 11,823,504 B1
(45) Date of Patent: Nov. 21, 2023

(54) DEVICE AND METHOD FOR CAPTURING AND VALIDATING VEHICLE TRIP PARAMETERS

(71) Applicant: Geotab Inc., Oakville (CA)

(72) Inventors: Himanshu Gulati, Waterloo (CA); Kanwaljit Basra, Milton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/994,130

(22) Filed: Nov. 25, 2022

Related U.S. Application Data

(60) Provisional application No. 63/417,539, filed on Oct. 19, 2022.

(51) Int. Cl.
*G07C 5/00* (2006.01)
*G07C 5/08* (2006.01)
*H04L 12/40* (2006.01)

(52) U.S. Cl.
CPC .......... *G07C 5/008* (2013.01); *G07C 5/085* (2013.01); *H04L 2012/40273* (2013.01)

(58) Field of Classification Search
CPC .............. G07C 5/008; G07C 5/085; H04L 2012/40273
USPC ........................................................ 701/113
See application file for complete search history.

(56) References Cited

U.S. PATENT DOCUMENTS

2017/0324667 A1* 11/2017 Camacho ........ H04M 1/724098
2020/0258322 A1* 8/2020 Davidson ................ G06F 17/00

\* cited by examiner

*Primary Examiner* — Tyler J Lee
*Assistant Examiner* — Tiffany P Ohman
(74) *Attorney, Agent, or Firm* — Sherif A. Abdel-Kader

(57) ABSTRACT

A telematics device and a method by the telematics device are provided. The method includes detecting a vehicle starting event and sending a first request while refraining from sending a second request for a requests-off duration. After the expiry of the requests-off duration, sending the second request. In response to detecting a vehicle turning off event, sending a third request and receiving a third response up to a post vehicle turning off duration.

18 Claims, 19 Drawing Sheets

Proper Driving Off Sequence

Improper Driving Off Sequence

Proper Parking Sequence

Improper Parking Sequence

DEVICE AND METHOD FOR CAPTURING AND VALIDATING VEHICLE TRIP PARAMETERS

FIELD

The present disclosure generally relates to vehicle telematics, and more specifically to a device and method for capturing and validating vehicle trip parameters.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method in a telematics device coupled to a vehicle communications bus of a vehicle. The method comprises detecting a vehicle starting event. In response to detecting the vehicle starting event the method includes sending over the vehicle communications bus a first request for a first parameter to a first electronic control unit (ECU) of the vehicle, receiving over the vehicle communications bus a first response containing the first parameter, and refraining from sending a second request for a second parameter, to a second ECU of the vehicle, for a requests-off duration. In response to an expiry of the requests-off duration, the method includes sending over the vehicle communications bus the second request for the second parameter to the second ECU of the vehicle, and receiving over the vehicle communications bus a second response containing the second parameter.

The first parameter may be from a first set of parameters that may change in status or value after the vehicle starting event and before the expiry of the requests-off duration.

The first parameter may comprise a plurality of parameters from the first set of parameters.

Sending the first request may comprise sending a plurality of requests sent at a first frequency.

Sending the second request may comprise sending a second plurality of requests at a second frequency which is lower than the first frequency.

The first set of parameters may comprise one or more of: a parking brake status parameter, a gear status parameter, and a seatbelt status parameter.

The second parameter is not from the first set of parameters.

The method may further comprise sending over a network interface the first parameter and the second parameter to a telematics server.

The vehicle may have an internal combustion engine (ICE) and detecting the vehicle starting event may comprise detecting an ignition event in the ICE.

The vehicle may be an electric vehicle (EV) and detecting the vehicle starting event may comprise detecting an EV on signal.

The method may further comprise detecting a vehicle turning off event. In response to detecting the vehicle turning off event, the method may further comprise sending over the vehicle communications bus a third request for a third parameter from a third set of parameters and receiving, over the vehicle communications bus, a third response containing the third parameter.

The method may further comprise repeating the previous steps of sending the third request and receiving the third response for a post vehicle turning off duration.

The method may further comprise sending the third parameter over a network interface to a telematics server.

Sending the third parameter may only be done when the third parameter is changed from a previous status.

In another aspect of the present disclosure, there is provided a telematics device for connecting with a vehicle. The telematics device comprises a controller, an asset interface coupled to the controller for connecting the telematics device with a vehicle communications bus of the vehicle, a network interface coupled to the controller, and a memory coupled to the controller. The memory stores machine-executable programming instructions which when executed by the controller configure the telematics device to detect a vehicle starting event. In response to in response to detecting the vehicle starting event, the machine-executable programming instructions configure the telematics device to send over the asset interface and the vehicle communications bus a first request for a first parameter to a first electronic control unit (ECU) of the vehicle, receive over the asset interface and the vehicle communications bus a first response containing the first parameter, and refrain from sending a second request for a second parameter, to a second ECU of the vehicle, for a requests-off duration. In response to an expiry of the requests-off duration, the machine-executable programming instructions configure the telematics device to send over the asset interface and the vehicle communications bus the second request for the second parameter to the second ECU of the vehicle, and receive over the vehicle communications bus a second response containing the second parameter.

The machine-executable programming instructions when executed by the controller may further configure the telematics device to detect a vehicle turning off event, and in response to detecting the vehicle turning off event send over the asset interface and the vehicle communications bus a third request for a third parameter from a third set of parameters, and receive over the asset interface and the vehicle communications bus a third response containing the third parameter.

The machine-executable programming instructions when executed by the controller may further configure the telematics device to repeat the steps of sending the third request and receiving the third response for a post vehicle turning off duration.

The first parameter may be from a first set of parameters that may change in status or value after the vehicle starting event and before the expiry of the requests-off duration.

The second parameter may not from the first set of parameters.

The machine-executable programming instructions when executed by the controller may further configure the telematics device to send over the network interface the first parameter and the second parameter to a telematics server.

In yet another aspect of the present disclosure, there is provided a method by a server, such as a telematics server. The method comprises receiving a vehicle starting indication from a telematics device coupled to a vehicle, receiving a plurality of parameters of a set of parameters from the telematics device, comparing the plurality of parameters with a proper driving off sequence, and sending an error indication to a remote device in response to determining that the plurality of parameters do not match the proper driving off sequence.

The remote device may comprise the telematics device.

The remote device may comprises an administration terminal or an operator terminal.

The plurality of parameters may be captured by the telematics device during a requests-off duration that started at a vehicle starting event.

The plurality of parameters may comprise one or more of a parking brake status, a gear status, and a driver's seatbelt status.

In yet another aspect of the present disclosure, there is provided another message by a server. The method includes receiving a vehicle turning off indication from a telematics device coupled to a vehicle, receiving a plurality of parameters from the telematics device, comparing the plurality of parameters with a proper parking sequence, and sending an error indication to a remote device in response to determining that the plurality of parameters do not match the proper parking sequence.

The remote device may comprise the telematics device.

The remote device may comprises an administration terminal or an operator terminal.

The plurality of parameters were captured by the telematics device during a duration that started at a vehicle turning off event.

The plurality of parameters may comprise one or more of a parking brake status, a gear status, and a driver's seatbelt status

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
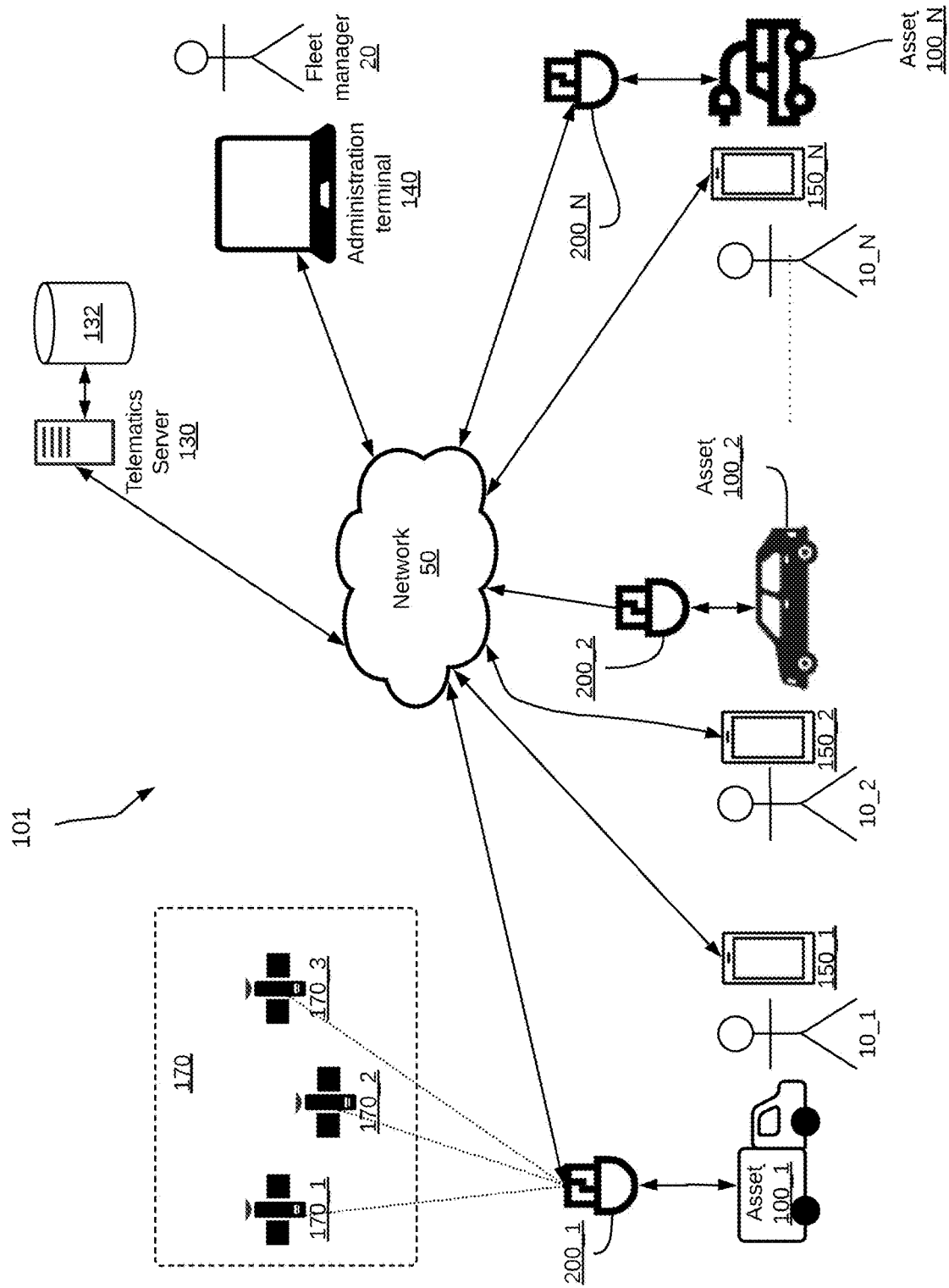
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

The telematics server 130 is an electronic device executing machine-executable programming instructions which enable the telematics server 130 to store and analyze telematics data. The telematics server 130 may be a single computer system or a cluster of computers. The telematics server 130 may be running an operating system such as Linux, Windows, Unix, or any other equivalent operating system. Alternatively, the telematics server 130 may be a software component hosted on a cloud service, such as Amazon Web Service (AWS). The telematics server 130 is connected to the network 50 and may receive telematics data from the telematics devices 200. The telematics server 130 may have a plurality of software modules for performing data analysis and analytics on the telematics data to obtain useful asset information about the assets 100. The telematics server 130 may be coupled to a telematics database 132 for storing telematics data and/or the results of the analytics which are related to the assets 100. The asset information stored may include operator information about the operators 10 corresponding to the assets. The telematics server 130 may communicate the asset data and/or the operator information pertaining to an asset 100 to one or more of: the administration terminal 140, and the operator terminal 150.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 140 is an electronic device, which may be used to connect to the telematics server 130 to retrieve data and analytics related to one or more assets 100 or to issue commands to one or more telematics device 200 via the telematics server 130. The administration terminal 140 is shown as a laptop computer, but may also be a desktop computer, a tablet (not shown), or a smartphone. The administration terminal 140 may run a web browser or a custom application which allows retrieving data and analytics, pertaining to one or more assets 100, from the telematics server 130 via a web interface of the telematics server 130. The administration terminal 140 may also be used to issue commands to one or more telematics device 200 via the telematics server 130. A fleet manager 20 may communicate with the telematics server 130 using the administration terminal 140. In addition to retrieving data and analytics, the administration terminal 140 allows the fleet manager 20 to set alerts and geofences for keeping track of the assets 100, receiving notifications of deliveries, and so on.

The operator terminals 150 are electronic devices, such as smartphones or tablets. The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by an operator 10 to inform the telematics server 130 that the asset 100 is being currently operated by the operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data." The telematics device 200 sends the telematics data to the telematics server 130 over the network 50. The telematics server 130 may process, aggregate, and analyze the telematics data to generate asset information pertaining to the assets 100 or to a fleet of assets. The telematics server 130 may store the telematics data and/or the generated asset information in the telematics database 132. The administration terminal 140 may connect to the telematics server 130, over the network 50, to access the generated asset information. Alternatively, the telematics server 130 may push the generated asset information to the administration terminal 140. Additionally, the operators 10, using their operator terminals 150, may indicate to the telematics server 130 which assets 100 they are associated with. The telematics server 130 updates the telematics database 132 accordingly to associate the operator 10 with the asset 100. Furthermore, the telematics server 130 may provide additional analytics related to the operators 10 including work time, location, and operating parameters. For example, for vehicle assets, the telematics data may include turning, speeding, and braking information. The telematics server 130 can correlate the telematics data to the vehicle's driver by querying the asset database 310. A fleet manager 20 may use the administration terminal 140 to set alerts for certain activities pertaining to the assets 100. When criteria for an alert is met, the telematics server 130 sends a message to the administration terminal 140 to notify a fleet manager 20, and may optionally send alerts to the operator terminal 150 to notify an operator 10 of the alert. For example, a vehicle driver operating the vehicle outside of a service area or hours of service may receive an alert on their operator terminal 150. A fleet manager 20 may also use the administration terminal 140 to configure a telematics device 200 by issuing commands thereto via the telematics server 130. Alerts may also be sent to the telematics device 200 to generate an alert to the driver such as a beep, a displayed message, or an audio message.

Telematics Device

Figure 2:
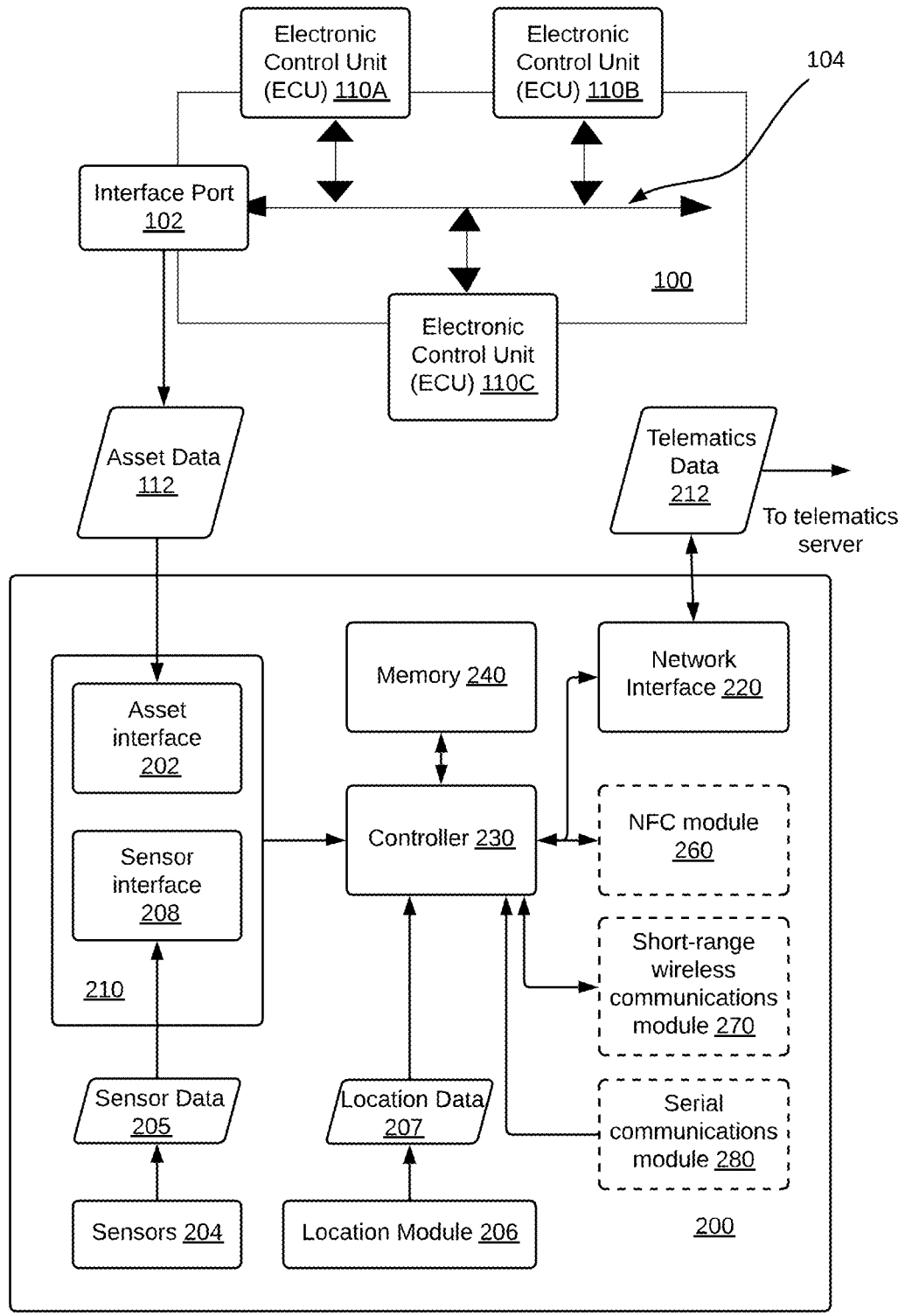
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an engine coolant temperature (ECT) ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 1106, and the ECU 110C ("the ECUs 110"). The ECU 110A, the ECU 1106, and the ECU 110C are shown to be interconnected via an asset communications bus. One example of an asset communications bus is a Controller Area Network (CAN) bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 104. Most passenger vehicles use the SAE J1979 protocol, which is commonly known as On-Board Diagnostic (OBD) protocol to exchange information between ECUs 110 on their CAN bus 104. In industrial automation, ECUs use a CANOpen protocol to exchange information over a CAN bus 104. An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to conduct the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 130 over a network 50. In some embodiments, the memory 240 only stores data, and the machine-executable programming instructions for conducting the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is traveling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 130. The network interface 220 may be used to transmit telematics data 212 obtained from the asset 100 to the telematics server 130 for a telematics service or other purposes. The network interface 220 may also be used to receive instructions from the telematics server 130 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 130.

The short-range wireless communications module 270 is a component intended for providing short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I2C) bus. As another example, the serial communications module 280 may be a universal serial bus (USB) transceiver.

In operation, an ECU 110, such as the ECU 110A, the ECU 110B, or the ECU 110C communicates asset data over the CAN bus 104. The asset data exchanged between the ECUs 110, over the CAN bus 104 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 which is composed of asset data 112 gathered from the asset 100 combined with the sensor data 205 and the location data 207 may be used to derive useful data and analytics, by the telematics server 130. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
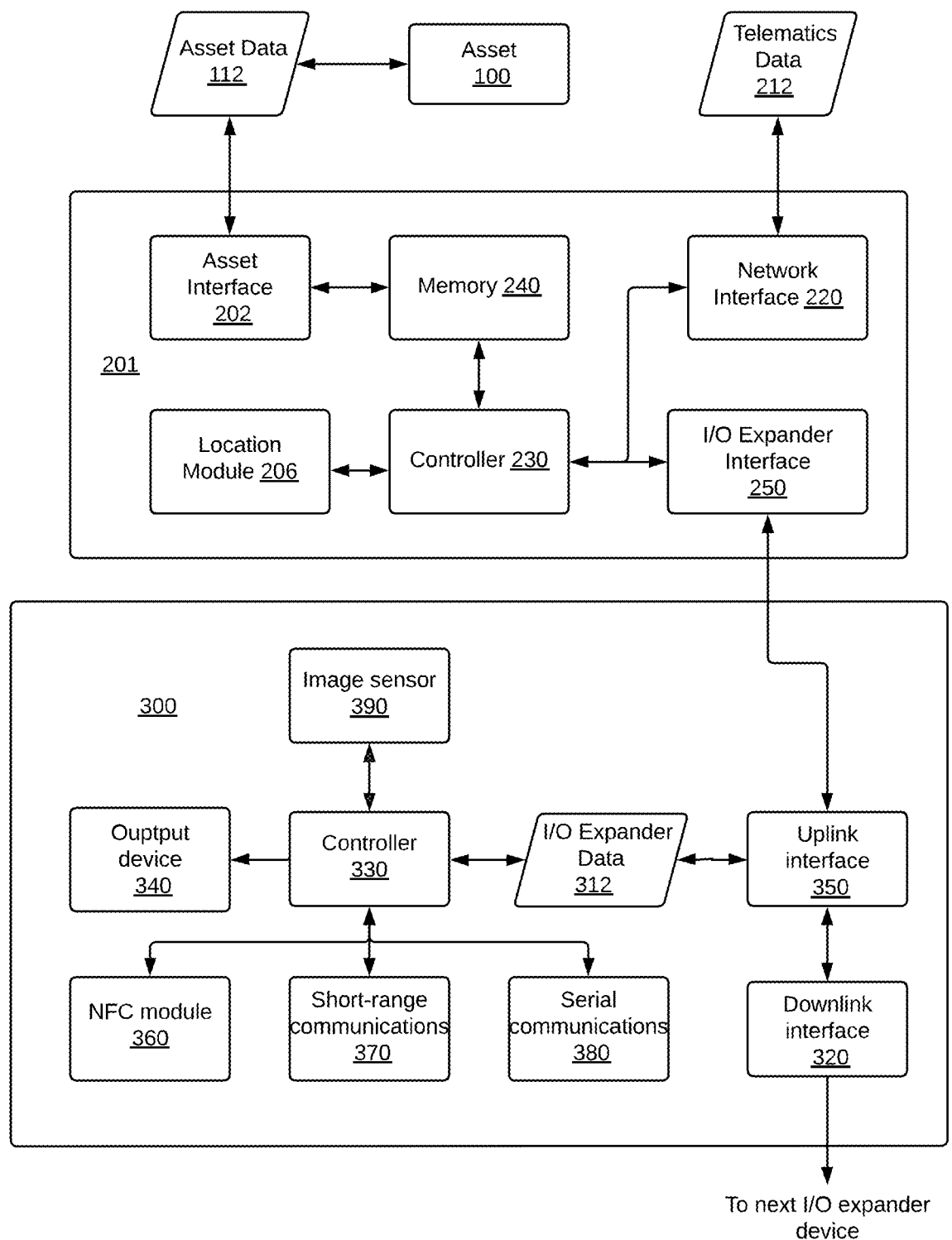
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 201 coupled to an asset 100. An I/O expander 300 is coupled to the telematics device 201.

The asset 100 is similar to the asset 100 of FIG. 2 and therefore the internal components thereof are not shown in FIG. 3 for simplicity.

The telematics device 201 has a somewhat similar configuration as the telematics device 200 of FIG. 2, but some of the optional components have been removed. Furthermore, the telematics device 201 adds an I/O expander interface 250 for interfacing with the I/O expander 300. The I/O expander interface 250 is coupled to the controller 230 and may be configured for exchanging I/O expander data 312 with the I/O expander 300.

The I/O expander 300 of FIG. 3 is an example I/O expander which is designed to provide additional connectivity options to a telematics device 200, which has more limited features than the one shown in FIG. 2. For example, the telematics device 201 shown in FIG. 3 does not have an NFC module, a short-range wireless communications module, or a serial communications module. Instead, the telematics device 201 has an I/O expander interface 250.

The I/O expander 300 may be an input device configured to capture additional data such as video frames, audio frames, or proprietary signals and provide that data to the telematics device 201. Alternatively, or additionally, the I/O expander 300 may be configured as an output device and may include a display for displaying information and/or an audio output device for broadcasting messages pertaining to the asset 100.

An I/O expander 300, which connects with the telematics device 201, varies in complexity depending on the purpose thereof. FIG. 3 shows an I/O expander 300 containing several components which may or may not all be present in other I/O expanders. For example, the I/O expander 300 includes a controller 330, an NFC module 260, an output device 340, a short-range communications module 370, an image sensor 390, a serial communications module 380, an uplink interface 350 and a downlink interface 320.

The controller 330 may be similar to the controller 230 in FIG. 3. In some embodiments, the controller 330 is a microcontroller with versatile I/O capabilities. For example, the controller 330 may be a microcontroller which has a plurality of I/O ports such as general-purpose inputs and outputs (GPIOs), serial ports, analog inputs, and the like. In some embodiments, the controller 330 may have built-in persistent memory such as flash memory on which machine-executable programming instructions for conducting the functionality of the I/O expander 300 may be stored. In other embodiments, the controller 330 may be coupled to a persistent memory module (not shown) that contains the machine-executable programming instructions for conducting the functionality of the I/O expander 300. The controller 330 may also have built-in volatile memory, such as random-access memory (RAM) for storing data. Alternatively, the I/O expander 300 may be connected to an external volatile memory for storing data.

The output device 340 receives data from the controller 330 and performs an output function. For example, the output device 340 may include a display for displaying information received from the controller 330. As another example, the output device 340 may include a speech synthesizer and a speaker for displaying audible information received from the controller 330. As yet another example, the output device 340 may be an output interface to a hardware device. For example, the output device 340 may be a motor controller that interfaces to an electric motor.

The NFC module 360, short-range communications module 370, and the serial communications module 380 are similar to the NFC module 260, short-range wireless communications module 270, and the serial communications module 280 described above with reference to FIG. 2.

The image sensor 390 may be a digital still camera or a digital video camera capable of capturing images. For example, the image sensor 390 may be a road-facing dashboard camera for monitoring the road ahead. In other examples, the image sensor 390 may be a driver-facing dashboard camera for identifying the operator 10 and/or their condition.

The uplink interface 350 is an electronic peripheral interface coupled to the controller 330 and is used to provide data exchange and/or power capabilities to the I/O expander 300. The uplink interface 350 allows the I/O expander 300 to transmit and receive I/O expander data. The uplink interface 350 is configured to use the same protocol and signaling as the I/O expander interface 250 of the telematics device 201. Accordingly, the I/O expander 300 may exchange the I/O expander data with the telematics device 201. In some embodiments, the uplink interface 350 may also include power pins connected to corresponding power pins in the I/O expander interface 250, thus allowing the I/O expander 300 to be powered via the telematics device 201. In other embodiments (not shown), the I/O expander 300 may have its own power source instead of or in addition to the power provided by the telematics device 201 via the uplink interface 350.

The downlink interface 520 is an electronic peripheral interface coupled to the uplink interface 350. The downlink interface 520 is configured to interface with the uplink interface 350 of another I/O expander 300 (as will be described below). Allowing the uplink interface 350 to connect to the downlink interface 320 of another I/O expander allows the daisy chaining of I/O expanders.

Integrated Telematics Device

Figure 4:
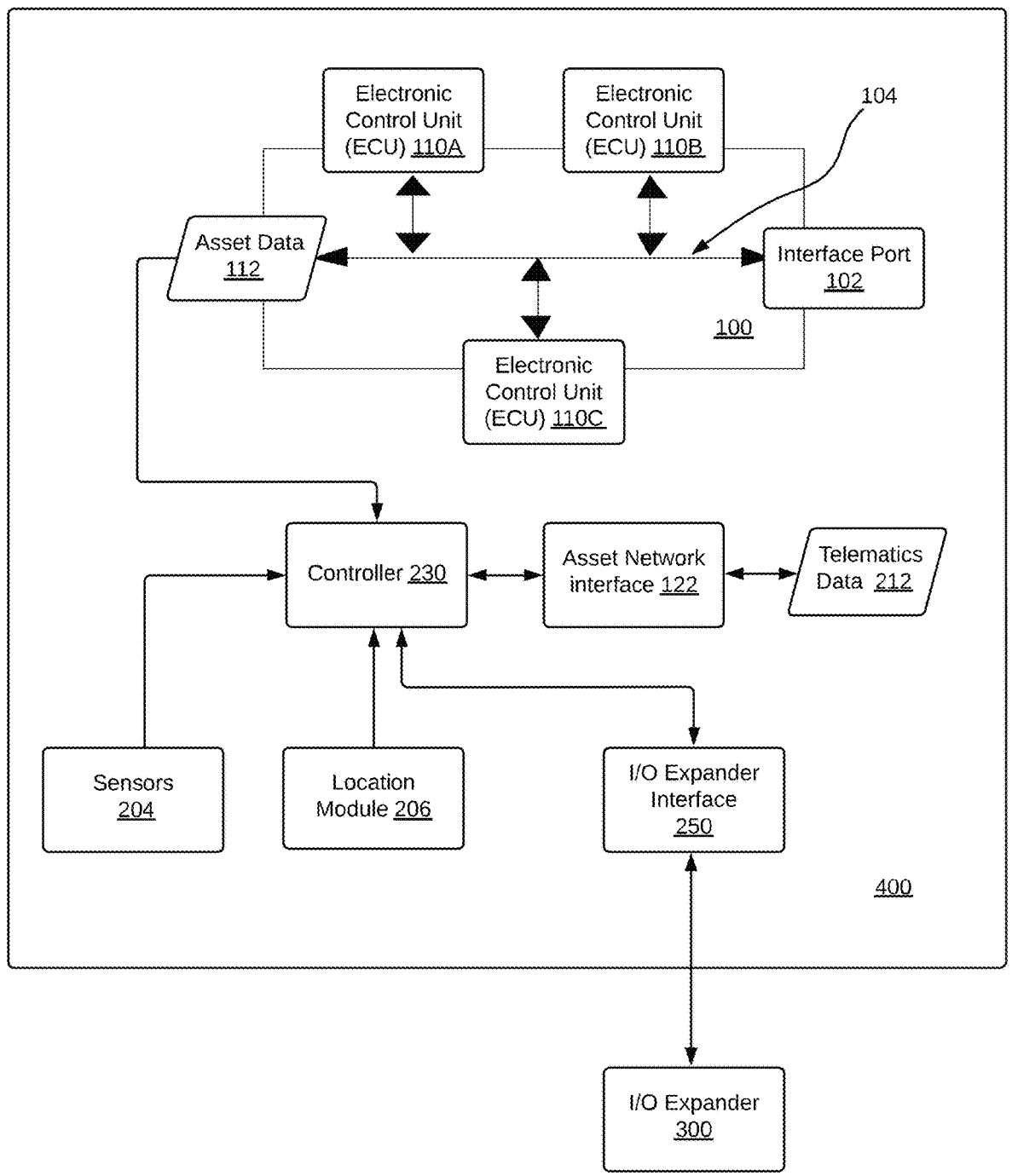
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 400 with the components of a telematics device integrated therein, in accordance with embodiments of the present disclosure. The asset 400 is similar to the asset 100 but, being a connected asset such as a connected car, it has an asset network interface 122. In the depicted embodiment, the controller 230 is directly connected to the asset communications bus, which is a CAN bus 104 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 400 and may be used by the asset 400 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 300 may be connected to the asset 400 therethrough. The asset 400 may have an interface port 102 for connecting other devices other than a telematics device 200, such as a diagnostic tool including, but not limited to, an OBD-II reader device.

Capturing Asset Data

A telematics device 200 may capture asset data 112 via the interface port 102 of an asset 100 via one of two main methods. The first method is for the telematics device 200 to listen for information placed, by the ECUs 110 on the asset communications bus. For example, for the CAN bus 104, the ECUs 110 may place broadcast CAN frames on the CAN bus 104 that the telematics device 200 can capture over the interface port. The second method is for the telematics device 200 to explicitly request information from a particular ECU 110 using a request command.

Broadcast ECU Data on Status Change

Figure 5:
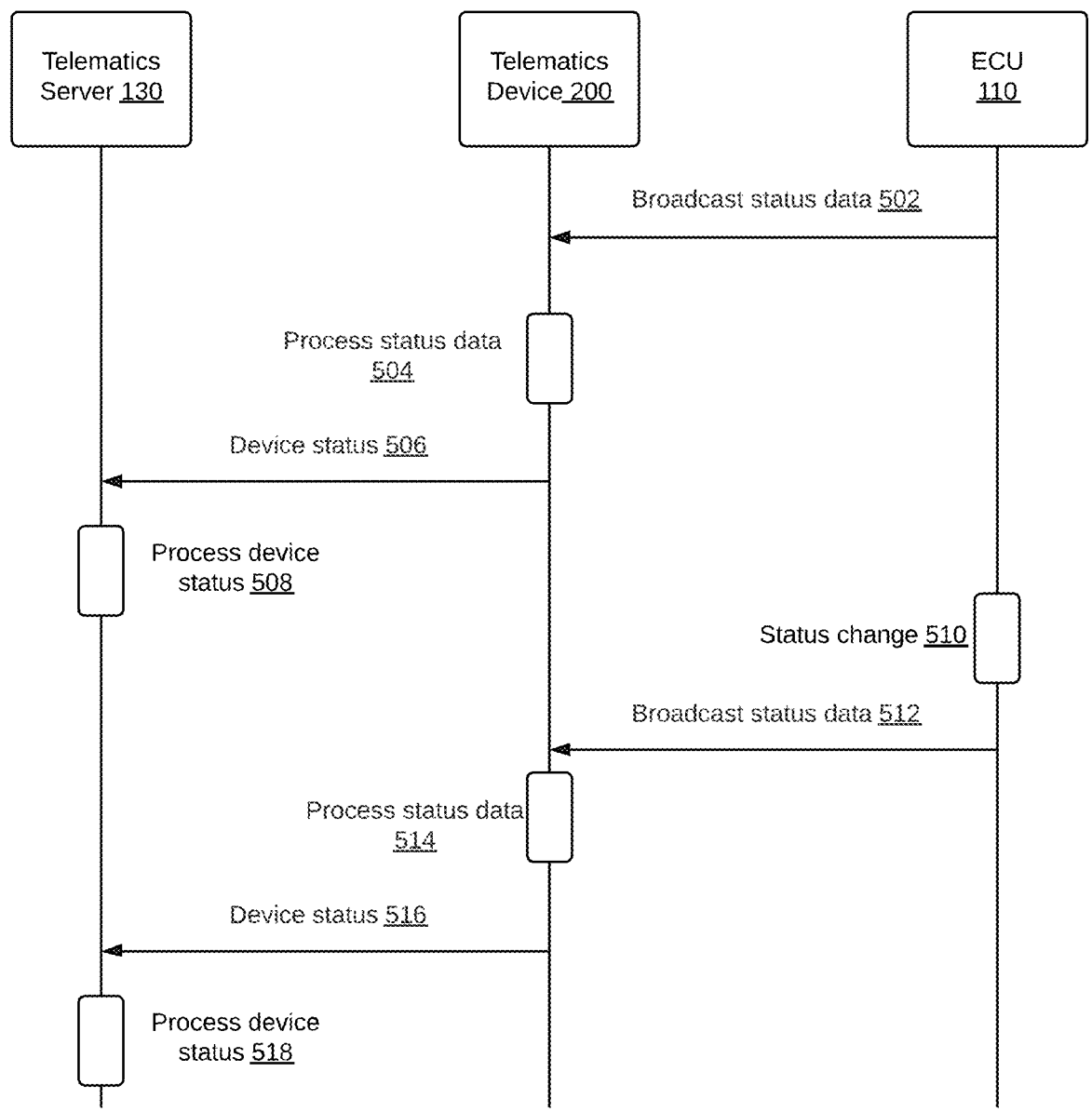
FIG. 5 is a message sequence diagram depicting a telematics device receiving broadcast status data from an electronic control unit (ECU) and forwarding device status to a telematics server, in accordance with embodiments of the present disclosure.

An ECU 110 may be configured to broadcast status data pertaining to a device or a subsystem of a vehicle, when the status of the device or subsystem changes. For example, an ECU 110 may send a broadcast frame on the CAN bus 104 whenever the parking brake changes status from being engaged to being disengaged, and vice versa. As an example, FIG. 5 depicts a message sequence diagram depicting an ECU 110 in communications with a telematics device 200, which in turn is in communication with a telematics server 130. In the depicted example, the status of a device or subsystem coupled to the ECU 110 changes. In response, the ECU 110 broadcasts status data to that effect, as shown in step 502. The broadcast status data step 502 may be in the form of a broadcast CAN frame placed on the CAN bus 104. The broadcast status data is picked up by the telematics device 200 from the CAN bus.

At step 504, the telematics device 200 processes the status data. For example, the telematics device 200 may examine the broadcast CAN frame received and retrieve the device status therefrom. For example, the telematics device 200 may determine that the received CAN frame contains information about the gear that the vehicle is in. Additionally, the telematics device 200 may parse and interpret the information in the received CAN frame to obtain a device status. For example, the device status may be "parking brake engaged", "parking brake disengaged", "gear is Drive", "gear is Park", "driver seatbelt fastened", or "driver seatbelt unfastened".

At step 506, the telematics device 200 sends the device status to the telematics server 130.

At step 508, the telematics server 130 processes the device status. For example, the telematics server 130 may store the device status in the telematics database 132. Additionally, the telematics server 130 may analyze the device status with respect to other device status information from the telematics device 200. For example, as described further below, the telematics server 130 may determine whether a proper sequence of actions were followed by the operator of the vehicle in which the telematics device 200 is installed. For example, the operator may be expected to fasten their seatbelt before driving off, and the device status showing when the seatbelt was fastened may come after a previous device status shows that the vehicle is in gear and that the RPM is above an idle value.

At step 510, the status of the device or subsystem coupled to the ECU 110 changes. For example, the parking brake may have been switched from the disengaged position to the engaged position, or the gear may have changed from the Drive position to the Park position.

At step 512, the ECU 110 broadcasts another status data frame, such as a broadcast CAN frame, similar to step 502.

At step 514, the telematics device 200 processes the status data, similar to step 504.

At step 516, the telematics device 200 sends the device status to the telematics server, similar to step 506.

At step 518, the telematics server 130 processes the devices status, similar to step 508.

Request for Device Status

As mentioned above, some ECUs 110 broadcast status data when the status of a corresponding device or subsystem coupled thereto, as discussed above with reference to FIG. 5. Other ECUs 110 do not broadcast data and need to be queried for the status of their corresponding device or subsystem. For example, the telematics device 200 may prepare a CAN frame containing a diagnostic protocol command requesting information about a particular vehicle parameter. The command may include a special identifier or pattern that a particular ECU 110 identifier recognizes. In response to recognizing the identifier, the ECU 110 may read the contents of the diagnostic protocol command and determine the requested information. In response to determining the requested information, the ECU 110 may provide the requested information by placing the requested information on the CAN bus 104 in the form of a CAN frame containing a diagnostic protocol response that contains the requested information.

Figure 6:
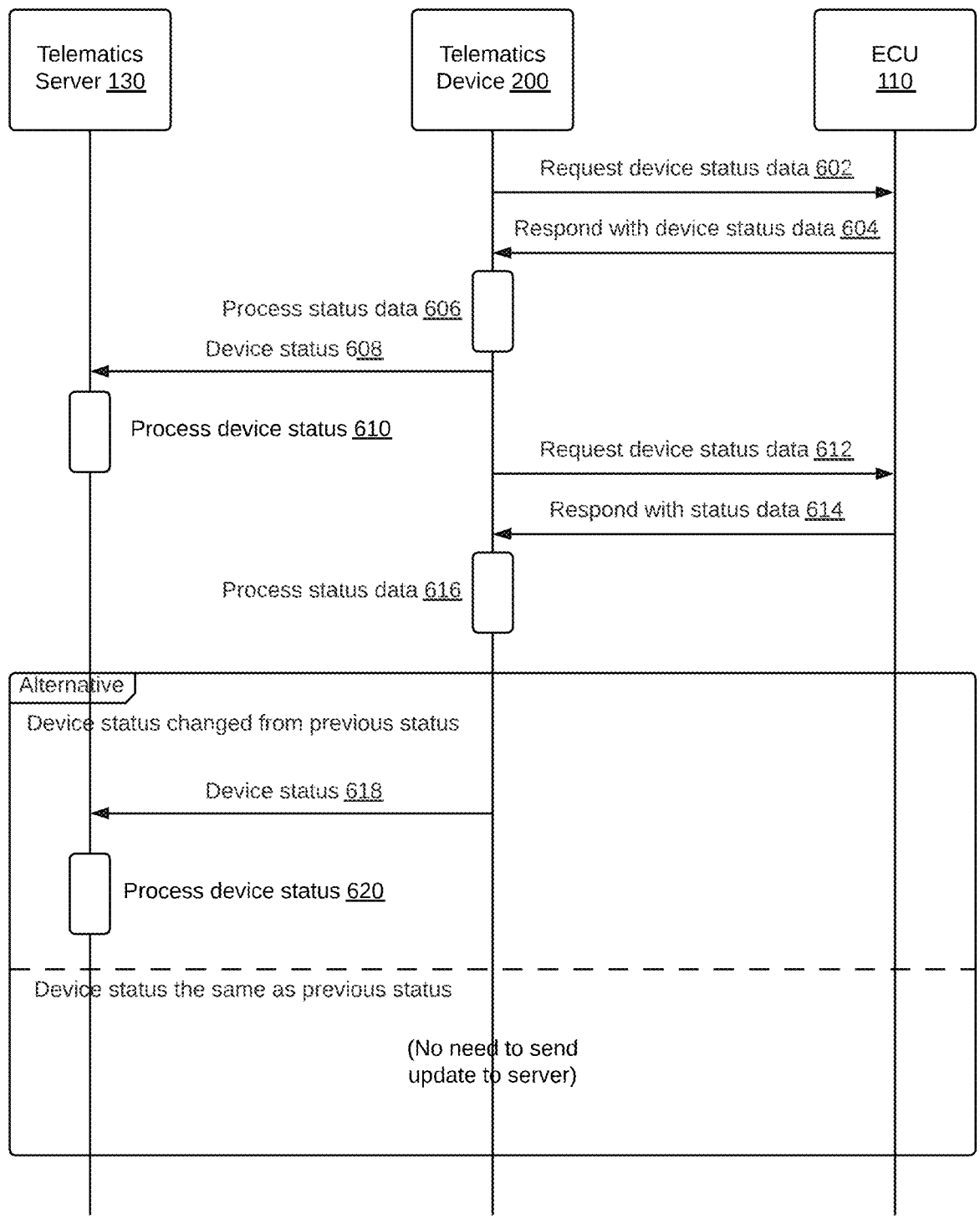
FIG. 6 is a message sequence diagram depicting a telematics device requesting device status data from an ECU, and forwarding device status to a telematics server when the device status changes from a previous value, in accordance with embodiments of the present disclosure.

FIG. 6 depicts a scenario where a telematics device 200 periodically queries an ECU 110 for the status of a device or subsystem coupled thereto, and reports the status to the telematics server 130 whenever there is a change. A description of the protocols used to query the ECU 110 and retrieve information therefrom is beyond the scope of this disclosure. By way of example, the ECU 110 may respond to requests in accordance with the Unified Diagnostic Services (UDS) protocol, the On-Board Diagnostic (OBD) protocol, or the like.

At step 602, the telematics device sends a request for device status data to the ECU 110. The request may be in respect of the status of a device or subsystem coupled to the ECU 110. The device status data may be a mode of operation or a value (e.g., RPM, or Engine Coolant Temperature (ECT)).

At step 604, the ECU 110 responds with the status data.

At 606, the telematics device 200 processes the status data and determines a device status.

At 608, the telematics device 200 sends the device status to the telematics server 130.

At 610, the telematics server 130 processes the device status.

The steps 602, 604, 606, 608, and 610 may represent the initial status determination of a device or a subsystem coupled to the ECU 110. For example, the steps 602, 604, 606, 608, and 610 may be executed after the vehicle is turned on to obtain an initial status of the various devices. The steps may be repeated for many ECUs 110 to obtain the status of the corresponding devices or subsystems.

Once an initial status of the various devices and subsystems of a vehicle are determined, the telematics device 200 may periodically obtain the status of some device or subsystems by querying their corresponding ECUs 110. Since the telematics server 130 has received the device status of the various devices or subsystems, the telematics device 200 may only send a device status to the telematics server 130 when the device status has changed from a previous value thereof. This is illustrated with reference to steps 612, 614, 616, 618, and 620.

At step 612, the telematics device 200 sends a request for device status data to the ECU 110, similar to step 602.

At step 614, the ECU 110 responds with the status data, similar to step 604.

At step 616, the telematics device 200 processes the data, similar to step 606.

After step 616, the telematics device 200 may compare the device status obtained in step 614 with the previous device status obtained in step 604.

If the device status has changed from the previous status, then at step 618, the telematics device 200 sends the new device status to telematics server 130. Then at step 620, the telematics server 130 processes the device status, similar to step 610.

If, after step 616, the telematics device 200 determines that the device status has not changed from the previous status obtained in step 604, then the telematics device 200 refrains from sending the device status data to the telematics server 130.

Electronic Control Unit (ECU) May be Asleep or Powered Off

Most ECUs in a vehicle are powered off when the ignition is off (For an internal combustion engine vehicle) or when the EV is off (for an electric vehicle). When the vehicle is turned on (i.e., ignition is turned on for an ICE vehicle or the EV is on for an electric vehicle), the ECUs 110 start powering up. Some of the ECUs 110 become ready to provide information before other ECUs 110. Some ECUs 110 may send broadcast CAN frame reporting some asset data. Other ECUs 110 power up and await a request command that requests data therefrom before placing any data on the CAN bus 104. Some ECUs 110 take a few seconds to become ready to accept request commands.

Figure 7:
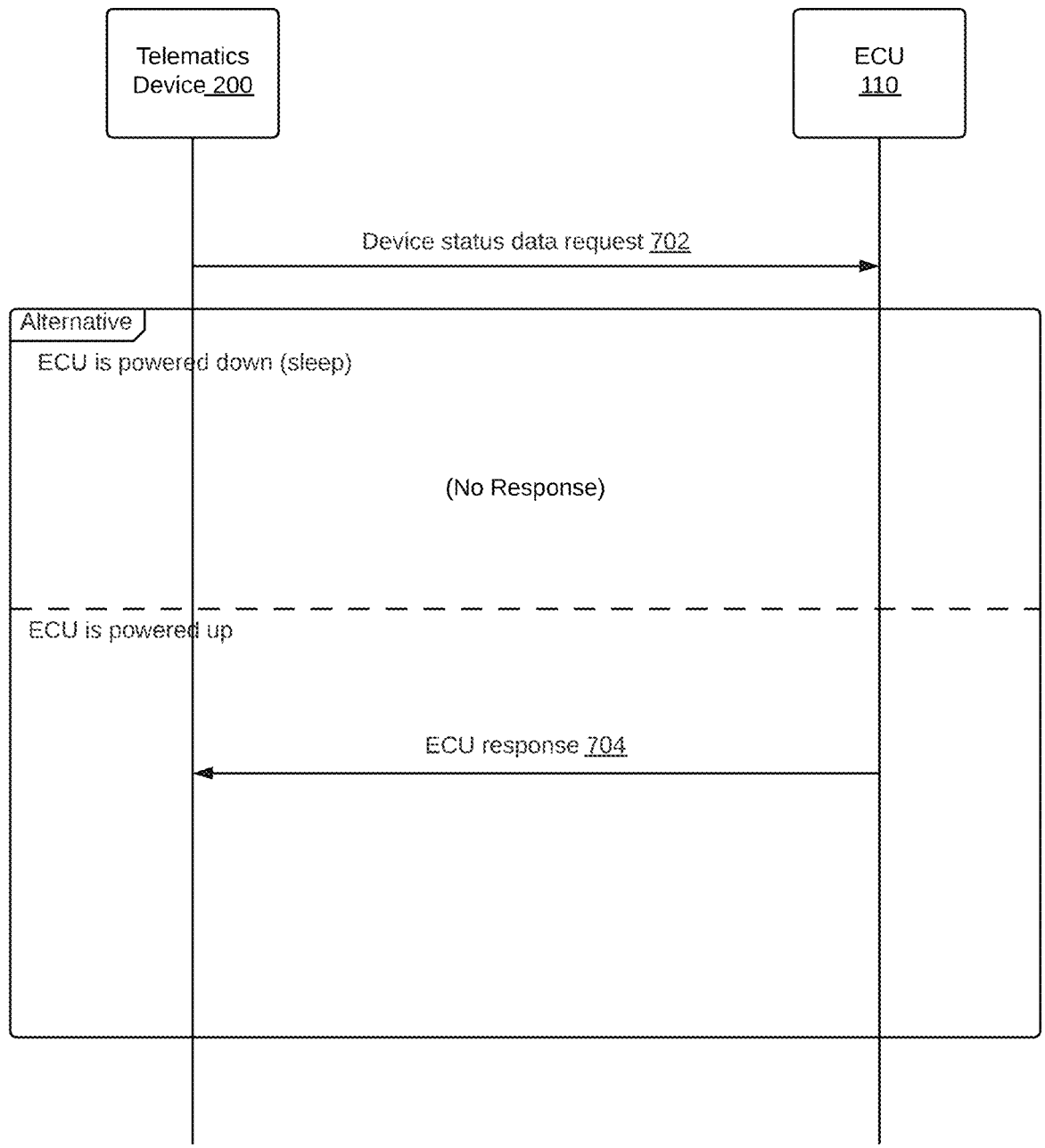
FIG. 7 is a message sequence diagram depicting a response by an ECU to a device status request from a telematics device, when both the ECU is powered down and powered up.

FIG. 7 is a message sequence diagram depicting a telematics device 200 making a device status request to an ECU 100. The device status request is sent in step 702. If the ECU 110 is powered down, then the telematics device 200 receives no response from the ECU 110. Alternatively, if the ECU 110 was powered up, then at step 704, the ECU 110 sends a response to the telematics device.

Possible Responses by an ECU

Figure 8:
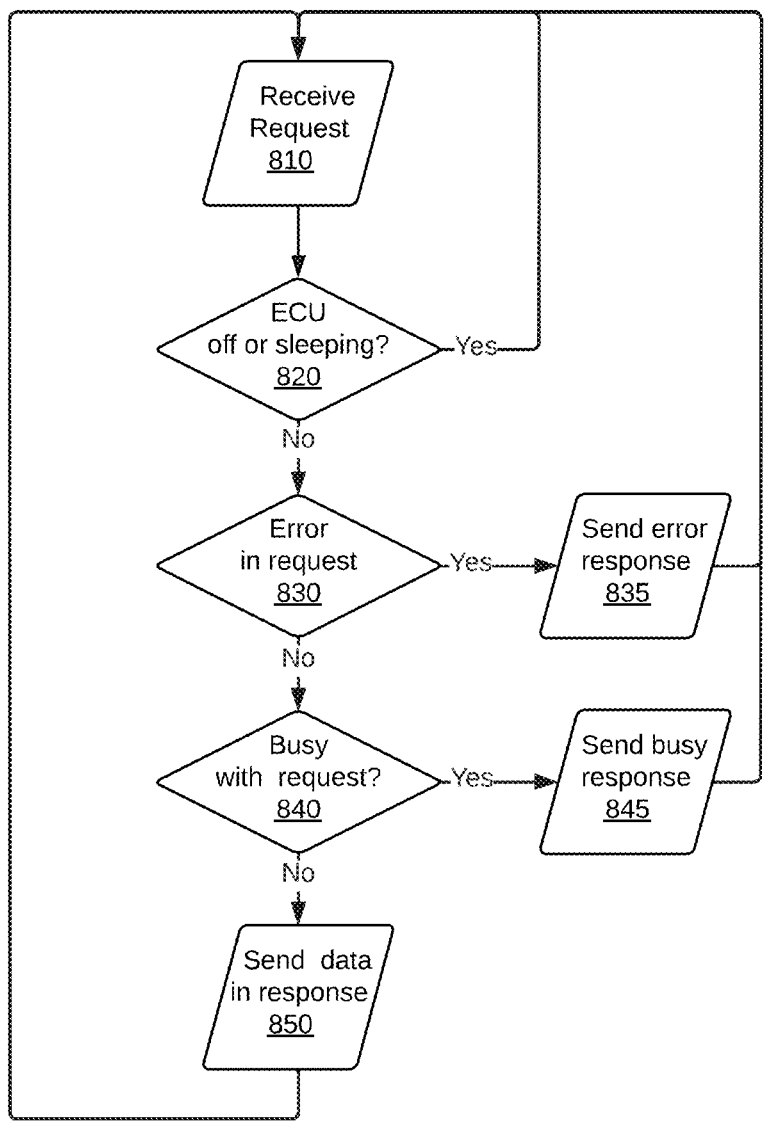
FIG. 8 is a flow chart depicting the different responses an ECU may provide in response to a request thereto.

When an ECU 110 receives a request for data therefrom, if the ECU is off or sleeping, then as discussed above with reference to FIG. 7, the ECU 110 does not respond to the request. If the ECU 110 is powered up and not in sleep mode (i.e., awake), then the ECU 110 responds in one of a few ways. FIG. 8 shows a simplified flow chart depicting a method by an ECU for responding to a request.

At step 810, the ECU 110 receives a request for data. If the ECU 110 is off or in sleep mode, then at step 820 no response is sent. If the ECU 110 is not in sleep mode and is powered up, then control goes to step 830.

At step 830, the ECU 110 examines the request. If the request has an error, then control goes to step 835. If the request has no error, then control goes to step 840.

At step 835, the ECU 110 sends an error response back to the sender of the request received in step 810. An error in the request may be in the form of malformed commands or data, or requesting data that is not available via the particular ECU 110.

At step 840, the ECU 110 checks whether it is busy with another request for data. If the ECU 110 is busy processing an earlier request, then control goes to step 845. If the ECU 110 is not busy processing an earlier request, then control goes to step 850.

At step 845, the ECU 110 sends a response to the sender of the request received at step 810 indicating that it is busy servicing an earlier request. The sender of the request may retry sending the same request at a later time.

At step 850, the ECU 110 sends the requested data in a response. This is due to the fact that the Ecu 110 is able to service the request and able to obtain the requested information.

Contention on Vehicle Communications Interconnect (e.g., the CAN Bus)

Since the CAN bus 104 is a shared communications interconnect, only one ECU 110 may place information (or data) on the CAN bus 104 at any given time. Data placed on the CAN bus 104 is available to all ECUs, but typically only one ECU 110 or the telematics device 200 consumes and acknowledges the data placed on the CAN bus 104. Due to the limitation for placing the data on the CAN bus 104, each ECU 110 must check the status of the CAN bus 104 before placing data on the CAN bus 104. If the CAN bus 104 appears to be in use, then the ECU 110 waits before attempting to place data on the CAN bus 104. For example, an ECU 110 may, upon determining that the CAN bus is busy, set a timer for several milliseconds or several hundred milliseconds. Upon the expiry of the timer, the ECU 110 retries to place the data on the CAN bus 104.

Figure 9A:
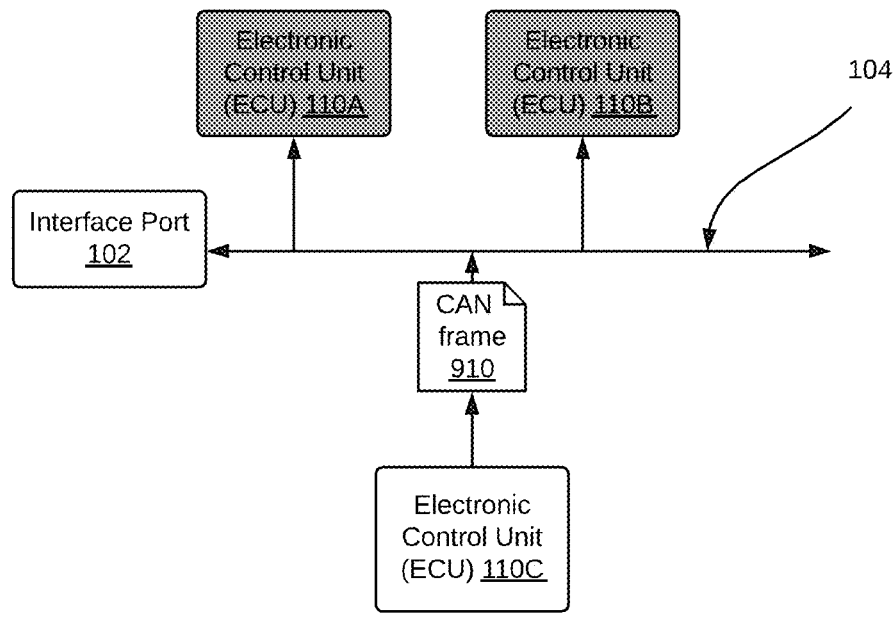
FIG. 9A is a block diagram depicting an ECU placing a Controller Area Network (CAN) frame on a CAN bus, while other ECUs are in listen mode.

FIG. 9A is a simplified diagram showing communication on the shared CAN bus 104 between the ECU 110A, the ECU 1106, and the ECU 110C. In the depicted scenario, the ECU 110C places a CAN frame 910 on the CAN bus 104. While the ECU 110C is using the CAN bus 104, the ECU 110A and the ECU 110B are in listen only mode on the bus. The ECU 110A and the ECU 110B may read the CAN frame 910, but may not place their own CAN frames on the CAN bus 104 at this time.

Figure 9B:
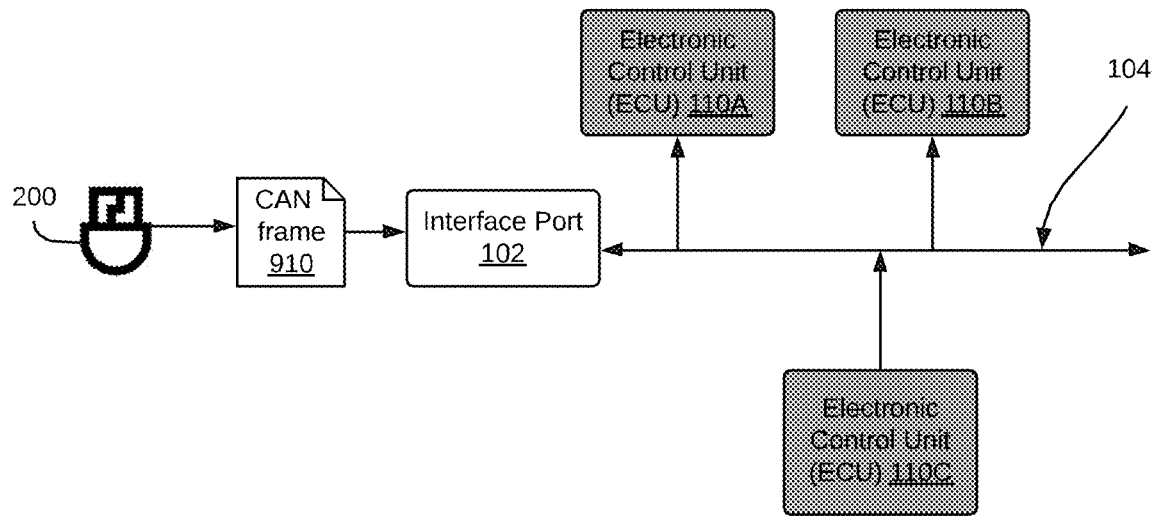
FIG. 9B is a block diagram depicting a telematics device placing a CAN frame on a CAN bus, via an interface port, while ECUs on the bus are in listen mode.

FIG. 9B is a simplified diagram showing communication on the shared CAN bus 104 between the three ECUs 110A, 110B, 110C, and a telematics device 200 connected to the CAN bus 104 via the interface port 102. In the depicted diagram, as the telematics device 200 places a CAN frame 910 on the CAN bus 104, the ECU 110A, the ECU 110B, and the ECU 110C all have to refrain from placing their own CAN frames on the CAN bus 104.

Due to the shared nature of the CAN bus 104, a telematics device 200 that makes a plurality of requests for data from a plurality of ECUs 110 within a substantially short period of time (e.g., within 500 milliseconds) will likely cause a contention on the CAN bus 104 as multiple ECUs 110 attempt to respond to the plurality of requests. As a result, many ECUs will end up retrying their requests a number of times thus delaying the overall time that it takes for the data to be available to the telematics device 200.

Issue Upon Turning ON Vehicle

Due to the aforementioned behavior of the ECUs upon turning a vehicle on, if the telematics device 200 were to make a plurality of requests for asset data immediately after the vehicle is turned on, then a few problems may occur in addition to the CAN bus contention problem described above. For example, some ECUs 110 may not be ready and may either return an error or return unreliable data. In either case, the telematics device 200 has to retry requesting the information which causes further contention on the CAN bus 104. In some cases, an ECU 110B may need data from another ECU 110C. If the ECU 110C has not yet been fully powered up, then requesting the asset data from the ECU 110B will cause the ECU 110B to return an error code indicating that it is not ready, which in turn causes more retries and contribute to further contention on the CAN bus 104.

Restrictions on Making Requests to ECUs when Vehicle is Turned ON and OFF

In view of the above-identified issues, the telematics device 200 may have a self-imposed no requests time window, which starts at the vehicle turning on event during which it refrains from making request to the ECUs 110. In some examples, the no requests time window has a no requests duration of about 5 seconds long. In some embodiments, in response to detecting that the vehicle to which the telematics device 200 is coupled has been turned on, the telematics device 200 may start a timer that expires after a no requests duration. Upon the expiration of the no requests duration, the telematics device 200 may commence making requests for asset data to one or more ECUs 110, by placing request commands on the CAN bus 104 via the interface port 102.

When a vehicle is turned off, the telematics device 200 refrains from making requests for data to the ECUs 110. Some ECUs 110 may power down or go to sleep mode and thus become unresponsive after the vehicle is turned off. Other ECUs 110 may continue to be powered up and continue to respond to requests sent thereto on the CAN bus 104. Since the vehicle is turned off, such ECUs 110 draw electric power from the vehicle's battery leading to potentially draining the battery after some time. Accordingly, the telematics device 200 may also have a self-imposed time window that starts at the vehicle turning off event, the self-imposed time window is one after which the telematics device 200 refrains from making further requests to the ECUs 110.

Figure 10:
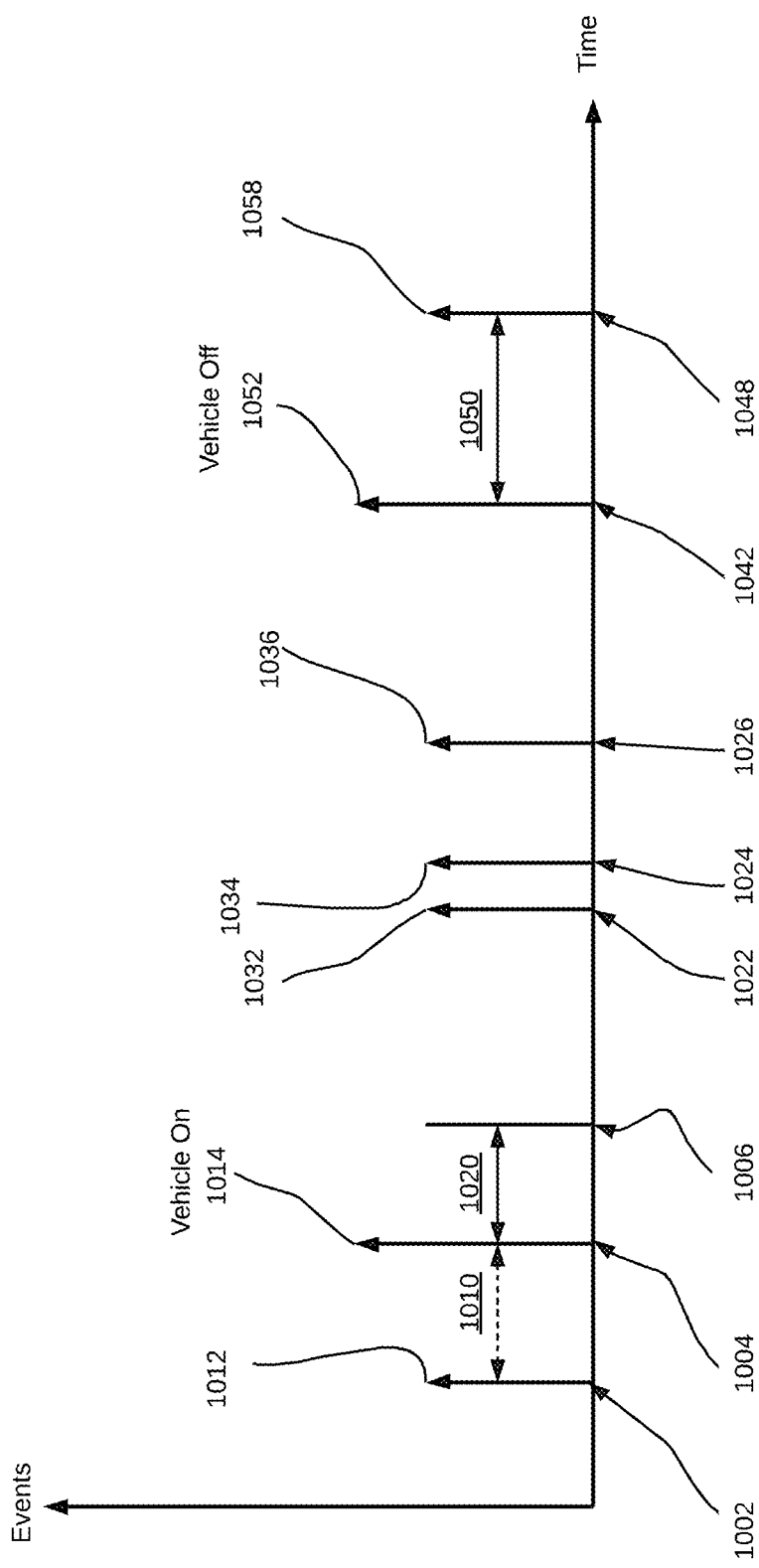
FIG. 10 is graph showing events that may be captured by a telematics device from a vehicle prior to the vehicle turning on, while the vehicle is on, and after the vehicle is turned off, in accordance with embodiments of the present disclosure.

With reference to FIG. 10, there is shown a graph including a number of events that relate to the vehicle being turned on and off. The graph also shows the self-imposed windows governing the behavior of the telematics device 200 with respect to requesting data from ECUs 110.

At the time 1002 a possible trigger event 1012 for the vehicle turning on is detected. For example, a motion sensor of the telematics device 200 may detected a motion consistent with someone entering the vehicle. During the duration 1010, the telematics device 200 may check for a number of events that indicate ignition for an ICE vehicle.

At the time 1004, the telematics device 200 detects a vehicle on event 1014. For a vehicle with an ICE, the vehicle on event may be an ignition event detected by checking for the number of events during the duration 1010. For an EV, the vehicle on event (a.k.a. "vehicle started event"), this may be an EV on signal provided by the EV to the telematics device 200 over the interface port 102, such as an OBD port.

Subsequent to the vehicle on event 1014, and for a requests-off duration depicted as the requests-off duration 1020 between the time 1004 and the time 1006, the telematics device refrains from sending requests to the ECUs 110 of the vehicle to which it is coupled. In some examples, the requests-off duration is as long as 5 seconds.

The telematics device 200 may send requests to a variety of ECUs 110, after the expiry of the requests-off duration. For example, at time 1022, the first request 1032 is made. At time 1024, a second request 1034 is made. At time 1026, a third request 1036 is made. After some time, at time 1042, there is a vehicle turning off event 1052. Subsequent to the vehicle turning off event, the telematics device 200 refrains from making requests for data from the ECUs 110.

The inventors have discovered that certain parameters need to be captured from the vehicle immediately after the vehicle is turned on, i.e., during the requests-off duration 1020. The inventors have also discovered that certain ECUs 110 continue to respond to requests after the vehicle is turned off, i.e., during the duration 1050.

Examples of parameters that may need to be captured shortly or immediately after the vehicle is turned on and after it has been turned off include, but are not limited to, vehicle trip parameters.

Vehicle Trip Parameters

Some companies, each with at least one fleet of vehicles, may have certain rules for their vehicle operators to follow when it comes to making deliveries and parking their vehicles at the end of a shift. For example, one rule that a fleet manager may set for the vehicle operators is that vehicles need to be turned off and not left idling during deliveries. This may, for example, reduce fuel cost, and/or eliminate the possibility of vehicle theft. Another rule that a fleet manager may set is that whenever the vehicle is stopped, the parking brake must be engaged. This rule may reduce the possibility of a vehicle sliding on a slop terrain and becoming involved in an accident. Yet another rule that vehicle operators must follow is placing the gear position in the Park position for a vehicle that has an automatic transmission. The Park position ensures that a parking pawl of the vehicle's transmission locks the transmission thus ensuring that the vehicle will not slide and become involved in an accident. A fleet manager thus wishes to accurately and timely monitor the aforementioned parameters. Additionally, the fleet manager also wishes to know that the vehicle operator is wearing a seat belt as long as the vehicle is running or is turned on at least. In some cases, it is also desirable that the vehicle operator may perform certain actions in a particular sequence.

Vehicle Parameters in a Basic Trip

Figure 11:
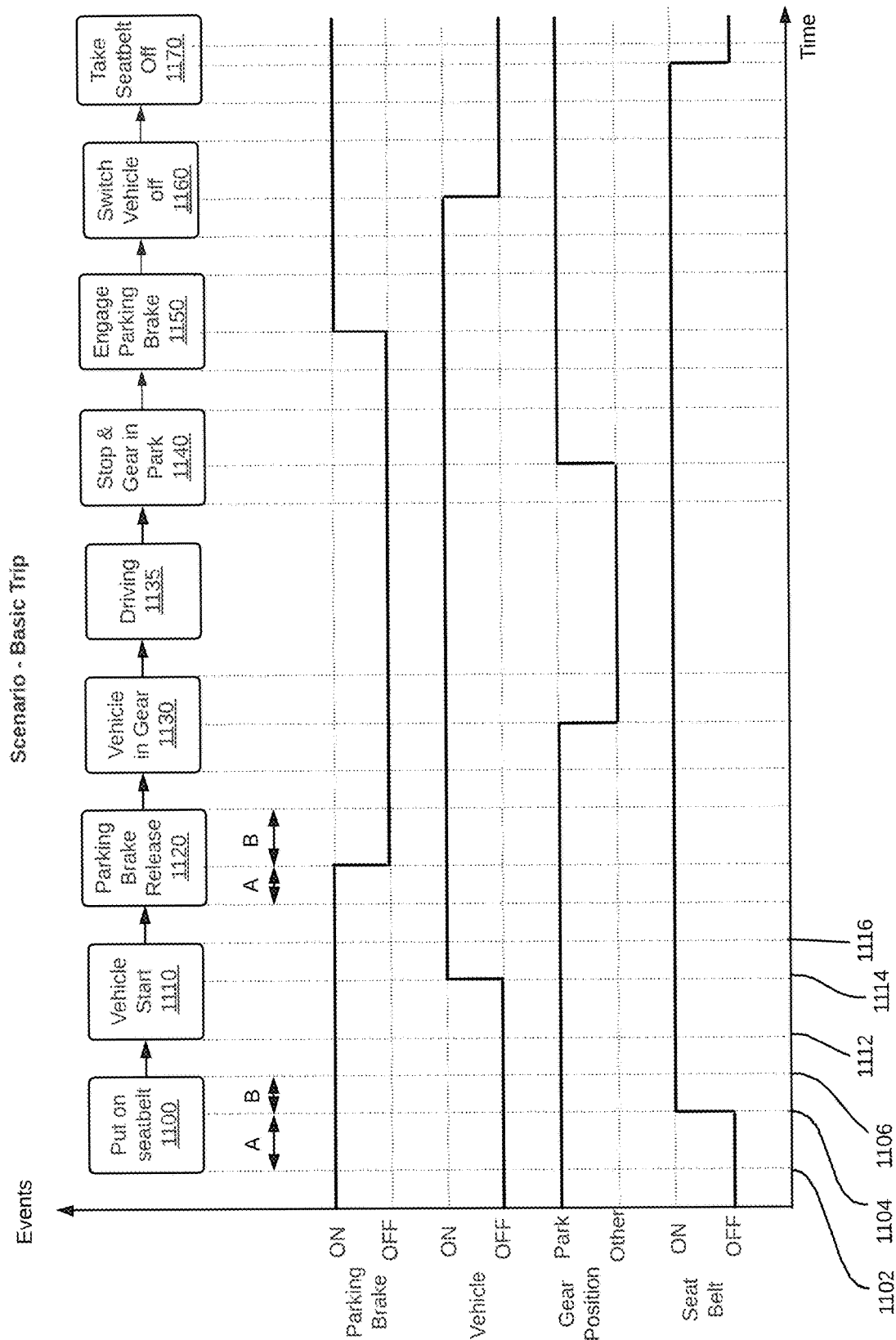
FIG. 11 is a graph showing vehicle trip parameter signals during a basic trip.

FIG. 11 shows some trip parameters of interest and how they change during a basic trip. In this context, a basic trip is one that includes no intermediate stops for delivery or rest. In FIG. 11, there are four timing diagrams for the following parameters: the parking brake, the vehicle being on or off, the gear position (park or another gear position), and the seat belt. The timing diagrams may represent a data value or signal generated by a respective ECU and placed on the CAN bus.

For the parking brake timing diagram, when the signal is high it indicates that an ECU corresponding to the parking brake has placed data on the CAN bus indicating that the parking brake is engaged (ON). Conversely, when the signal is low, that means that the ECU corresponding to the parking brake has placed a signal on the CAN bus indicating that the parking brake is disengaged (OFF).

For the vehicle on timing diagram, when the signal is high it indicates that an ECU corresponding to the vehicle has placed data on the CAN bus indicating that the vehicle is on. In an electric vehicle (EV) that may be an EV ON signal. In an internal combustion engine, this may be an ignition signal. Conversely, when the vehicle on signal is low, then the vehicle is off.

For the gear position timing diagram, when the signal is high it indicates that an ECU coupled to the transmission has placed data on the CAN bus indicating that the transmission is in the Park position. Conversely, when the signal is low it indicates that the ECU coupled to the transmission has placed data on the CAN bus indicating that the transmission is in another position other than the Park Position. It should be noted that the timing diagram represents a simplification for the purpose of this disclosure. An ECU may generally place transmission data about the current gear that the transmission is configured to use, and the telematics device may contain logic that interprets the transmission data. For example, logic on the telematics device may return 1 or "true" if the current gear position is the Park position and 0 or "false" otherwise.

For the seatbelt timing diagram, when the signal is high it indicates that the driver (operator) side seatbelt being inserted into the respective buckle indicating that the driver has fastened their seatbelt. Conversely, when the signal is low it indicates that the driver side seatbelt is not inserted into the respective buckle, i.e., is not fastened by the driver.

In FIG. 11, a time duration (A) and a time duration (B) are shown for some events for brevity. The time durations (A) and (B) represent delays between when an event takes place or a request for a device status is made, and when the telematics device 200 receives the status.

Time Between an Event and Placement of Indication on CAN Bus

The duration (A) represents the time between an event taking place or a device coupled to an ECU changing the status thereof, and when the data indicating the status change is available on the CAN bus. If an ECU 110 uses broadcast CAN frames to indicate the status of the device or subsystem coupled thereto, then the duration (A) represents the time between when the event (i.e., a status or value change in the device or subsystem coupled to the ECU) took place and when the ECU placed the broadcast CAN frame on the CAN bus 104. Alternatively, if the ECU 110 waits for requests to respond with device status data, then the time (A) represents the time since when the event took place, the time it took the telematics device 200 to request the device status (as in step 602 of FIG. 6), and the time it took the ECU to respond to the request (as in step 604 of FIG. 6). The delay (A) may also include a delay because of bus contention, as discussed with reference to FIGS. 9A and 9B. If the CAN bus is busy then the ECU 110 needs to retry placing the event data on the CAN bus 104, which increases the duration (A).

Reducing the duration (or delay) (A) may be accomplished by a number of actions.

For certain (high priority) parameters, the telematics device 200 may request the status thereof at a higher frequency than other parameters. For high priority parameters, the telematics device 200 may send requests to the respective ECUs 110 coupled to the devices that provide such parameters at a first frequency, while for the rest of the parameters the telematics device may send requests to their respective ECUs at a second frequency that is lower than the first frequency. For example, the telematics device may request the high priority status of certain devices every 1 second to every 5 seconds, while for the rest of the devices, the telematics device 200 may request the status of such devices every 60 seconds to every 300 seconds (5 minutes).

For ECUs 110 which place device status data in broadcast CAN frames, reducing the time (A) may be accomplished by the telematics device 200 refraining from making many requests to ECUs 110 that would cause bus contention at times when the ECUs may place high priority parameter information (i.e., device status that is of high priority) on the CAN bus 104.

Another solution for reducing the time duration (or delay) (A) is to increase the frequency of checking for certain events upon detecting related events. For example, with reference to FIG. 11, when a vehicle start event 1110 is detected, the duration (A) for the parking brake release event 1120 and the vehicle in gear event 1130 may be reduced by increasing the frequency at which the telematics device 200 requests information about the parking brake release event 1120 and the vehicle in gear event 1130.

Time Between Placement of Indication on CAN Bus and Retrieving Indication by the Telematics Device The time duration (B) represents a time delay between when the ECU places data about the event on the CAN bus and when the telematics device captures that data. The duration (B) may represent the time between when the ECU places a broadcast CAN frame on the CAN bus and when the telematics device 200 reads that broadcast CAN frame. Alternatively, if the ECU only responds to direct requests, then the duration (B) represents the time between when the ECU places a response (such as the one in step 604 of FIG. 6) on the CAN bus 104, and when the telematics device 200 reads that response.

To reduce the duration (B) for cases where the ECU places broadcast information on the CAN bus containing the device status, the telematics device 200 may need to increase the frequency at which the telematics device 200 checks the CAN bus 104 for frames. This applies to both broadcast CAN frames and response frames containing device status data. However, increasing such frequency all the time is not desirable as it increases the processing load and power consumption of the telematics device 200. Specifically, the telematics device 200 typically sleeps and wakes up periodically to check the CAN bus 104. By increasing the frequency of checking the CAN bus 104, the telematics device 200 sleeps less and consumes more power.

One solution, similar to what has been suggested above for reducing the delay (A), is for the telematics device 200 to check the CAN bus for broadcast information at a higher frequency upon detecting certain events. For example, when the vehicle is stopped and placed in gear as in the gear in park event 1140, the telematics device 200 may increase the frequency at which the telematics device 200 checks the CAN bus 104 for broadcast CAN frames, which may contain information about the parking brake status (such as an parking brake engagement event 1150), a vehicle turning off status (such as a switch vehicle off event 1160), or a seat belt being unfastened (take seatbelt off event 1170).

Another solution is, for high priority events or parameters, the telematics device 200 can check the CAN bus 104 for response frames (such as the one in step 604 of FIG. 6) at a higher frequency once a request frame (such as the one in step 602 of FIG. 6) has been sent.

The time durations (A) and (B) are only shown for a few events for brevity and so as not to clutter FIG. 11.

Trip Parameter Events

In FIG. 11, a typical trip without any intermediate stops is depicted. The horizontal axis represents time. Accordingly, all reference numerals on the horizontal axis represent time. A driver putting on the seatbelt is shown as a seatbelt on event 1100. The driver puts on the seatbelt at the time 1102. At time 1104, the seatbelt ECU places an indication on the CAN bus that the seatbelt is fastened. At time 1106, the telematics device 200 has read the seatbelt indication.

At some point the driver starts the vehicle, shown as a vehicle start event 1110. At 1112, the vehicle is started (or turned on). At 1114, an ECU places, on the CAN bus 104, an indication that the vehicle has been turned on. At 1116, the telematics device 200 reads the vehicle on indication.

To drive off, the driver releases the parking brake, shown as a parking brake release event 1120. At 1122, the parking brake is released. At 1124, the indication that the parking brake is released is available on the CAN bus 104. At 1126, the telematics device reads the parking brake release indication.

The event 1135 represents the vehicle being driven. Throughout the driving, the vehicle remains in gear (i.e., Drive position for automatic transmission vehicles), the seatbelt remains fastened, and the parking brake remains disengaged.

At the end of the shown basic trip, the operator (driver) stops the vehicle and places the transmission in the Park position, shown as the stop and gear in park event 1140. The operator then engages the parking brake, shown as the engage parking brake event 1150. The vehicle is then switched off, which is shown as the switch vehicle off event (or vehicle turning off event) 1160. For an internal combustion engine vehicle, this means that the ignition is turned off. For an electric vehicle, this means that the EV has been switched off. Finally, the operator takes off the seatbelt, shown as the take seatbelt off event 1170.

The sequence of putting on the seatbelt (event 1100), starting the vehicle (event 1110), releasing the parking brake (parking brake release event 1120), then placing the vehicle in gear (vehicle in gear event 1130) may be referred to as a proper driving off sequence. Other driving off sequences may be acceptable as well. Similarly, the sequence of events comprising placing the gear in the Park position (gear in Park position event 1140), engaging the parking brake event 1150, switching off the vehicle event 1160, and taking off the seatbelt (seatbelt off event 1170) may be referred to a proper parking sequence. A fleet manager may wish to be notified of the aforementioned events in the order in which they occurred in order to assess the vehicle operator's compliance with both the proper parking sequence and the proper driving off sequence.

The above-described basic trip is an example of a simple delivery where a vehicle picks up goods from one place and delivers them to another place without any stopovers. There may also be guidelines with respect to stopping in the midst of a trip for rest or to make a delivery, as discussed below.

Vehicle Parameters in a Packet Delivery with Zero Idle Policy

Figure 12:
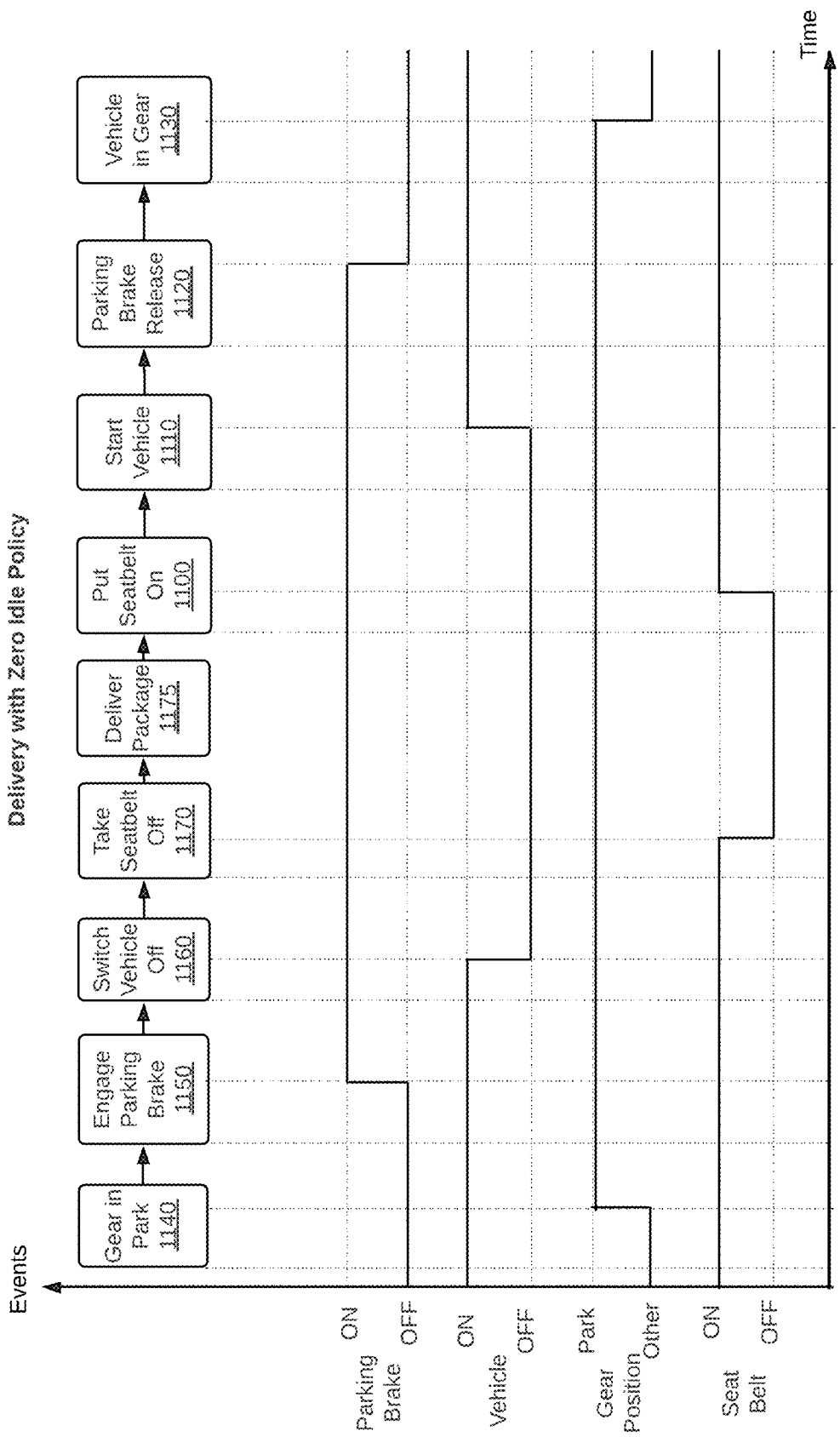
FIG. 12 is a graph showing vehicle trip parameter signals during a delivery.

FIG. 12 shows some trip parameters of interest and how they change during a package delivery. The sequence of events in FIG. 12 may take place in the midst of the basic trip of FIG. 11 during the driving event 1135. The delivery starts with the gear being placed in park (gear in Park position event 1140), engaging the parking brake 1150, switching the vehicle off (vehicle turning off event 1160), then taking off the seatbelt event 1170. The package delivery 1175 takes place. Package delivery may take several minutes. Upon returning to the vehicle, the driver puts on the seatbelt (event 1100), starts the vehicle (event 1110), releases the parking brake (parking brake release event 1120), puts the vehicle in gear (vehicle in gear event 1130), then starts the vehicle.

Proper and Improper Driving Off Sequence

Figure 13A:
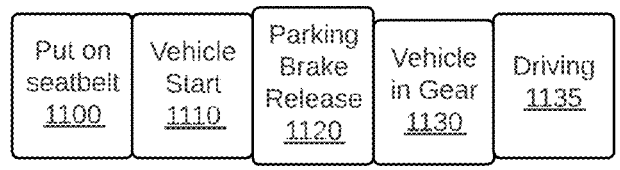
FIG. 13A is diagram showing an example of a proper driving off sequence of vehicle events.
Figure 13B:
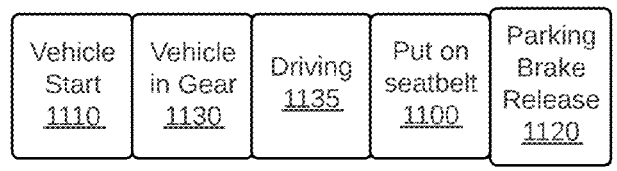
FIG. 13B is a diagram showing an example of an improper driving off sequence of vehicle events.

While FIGS. 11 and 12 have shown trip parameter events that are expected in a basic trip and in a delivery. Examples of proper driving off sequences were shown in both Figures. FIGS. 13A and 13B depict proper and improper driving off sequences. For example, FIG. 13A shows a proper driving off sequence in which there is a seatbelt on event 1100, followed by a vehicle start event 1110, a parking brake release 1120, and then placing a vehicle in gear (gear event 1130). Finally a driving off event 1135 takes place (i.e., the RPM is higher than the idle value and the vehicle is in gear). FIG. 13B shows an improper driving off sequence. In FIG. 13B, the vehicle is started (event 1110), then placed in gear (vehicle in gear event 1130), then driving 113 is detected. Subsequent to the driving event, the seatbelt is on (fastened) (seatbelt event 1100), and then the parking brake is released. The order of the events in FIG. 13B represents the order in which the events were detected by the telematics device 200. It is possible that the operator of the vehicle has performed the proper driving off sequence, but that some events were not delivered to the telematics device 200 at the precise times. This may be explained with reference back to FIG. 10. In FIG. 10, the vehicle is turned on (event 1014) at the time 1004, and the telematics device refrains from requesting data from ECUs during the requests-off duration 1020 between the times 1004 and the time 1006. Accordingly, the telematics device 200 may receive the events indicating the status change of the seatbelt on event 1100 and releasing the parking brake (parking brake release event 1120) after the time 1006 even if these events took place between the time 1004 and the time 1006. With reference to FIG. 13B, the seatbelt on event 1100 and the parking brake release 1120 both may have taken place during the requests-off duration 1020 and thus not reported until after the time 1006 of FIG. 10.

Proper and Improper Parking Sequence

Figure 14A:
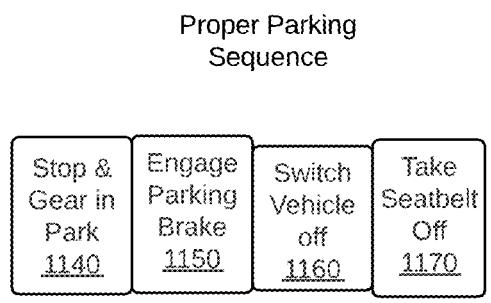
FIG. 14A is a diagram showing an example of a proper parking sequence of vehicle events.

In addition to improper driving off sequences, a trip may also include an improper parking sequence. FIG. 14A shows a proper parking sequence at the end of a basic trip, such as the trip of FIG. 11, or the stop for delivery of FIG. 12. As shown in FIG. 14A, one proper parking sequence that may be expected from the operator of a vehicle is depicted. First the vehicle is stopped and the gear is placed in the Park position (gear in Park position event 1140). Next, the parking brake is engaged 1150. The vehicle is then switched off (vehicle turning off event 1160). Finally, the seat belt is unfastened (event 1170). Other proper parking sequences are also possible. For example, the parking brake engagement event 1150 may come before the gear in Park position 1140 event.

Figure 14B:
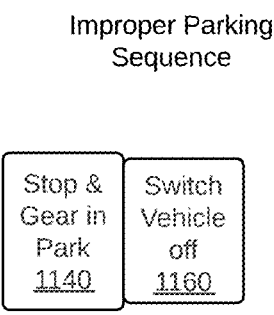
FIG. 14B is a diagram showing an example of an improper parking sequence of vehicle events.

FIG. 14B shows an improper parking sequence. In FIG. 14B, the vehicle is stopped and the transmission is placed into Park (gear in Park position event 1140). Next, the vehicle is switched off (vehicle turning off event 1160). No other events are detected at the telematics device 200. Thus the parking sequence of FIG. 14B is an improper parking sequence for missing engaging the parking brake 1150 and unfastening the seatbelt (event 1170). Even if the operator had stayed in the vehicle and kept their seatbelt on, the fleet manager 20 may require that any time the vehicle is parked, the parking brake must be engaged.

The missing events related to the parking brake and the seatbelt in FIG. 14B can be explained with reference to FIG. 10. If the telematics device refrains from querying all ECUs 110 when the vehicle is turned off (event 1052) at time 1042, then any subsequent events are missed. For example, if the parking brake is engaged during the post vehicle turning off duration 1050, then the telematics device 200 will not capture the event relating to engaging the parking brake.

Methods which attempt to avoid false detection of an improper driving sequence and an improper parking sequence are explained below.

Method for Avoiding False Detection of Improper Driving Sequence

Figure 15:
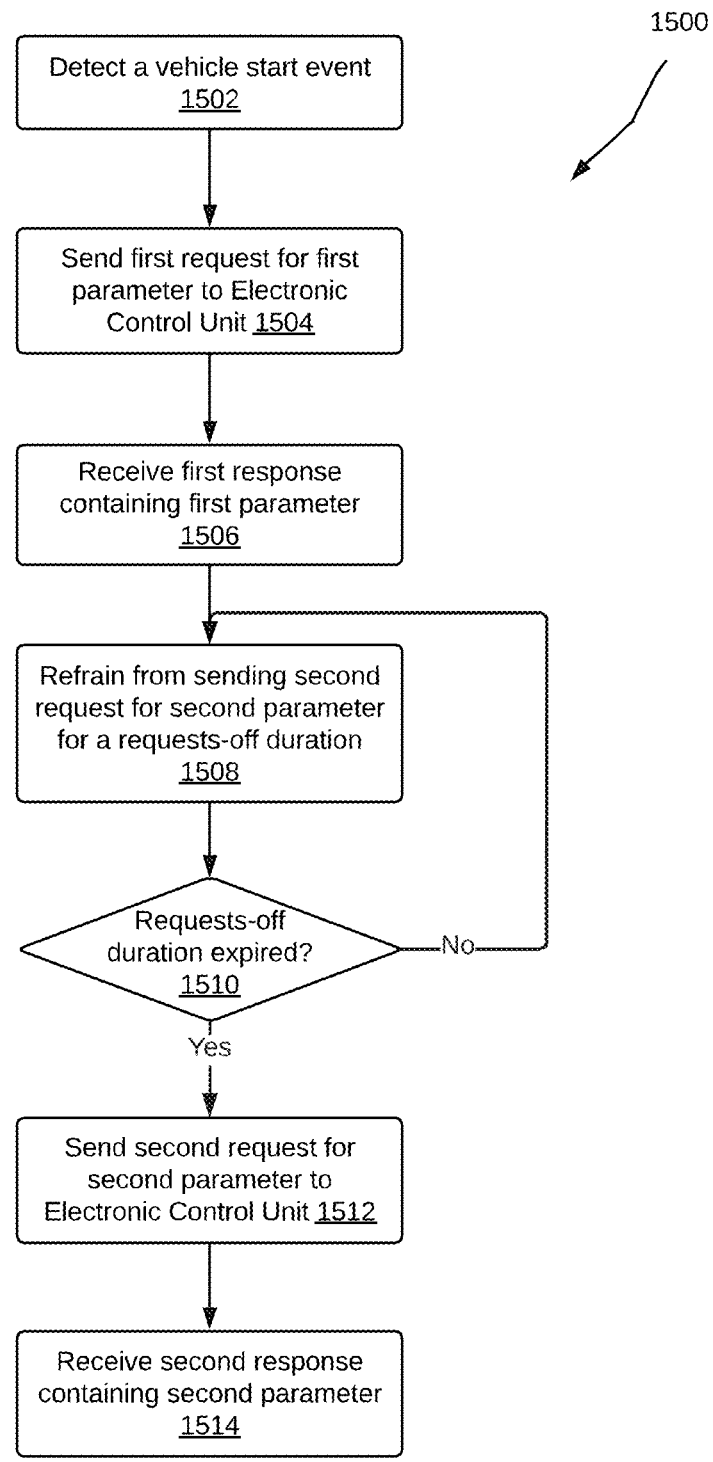
FIG. 15 is a flow chart showing a method for capturing vehicle parameters during and after a requests-off duration, in accordance with embodiments of the present disclosure.

To reduce the potential for capturing some events later than they took place and thus reduce the possibility of incorrectly reporting an improper driving sequence, a method 1500, by the telematics device 200, is proposed, with reference to FIG. 15. The method 1500 may be used to capture data after detecting a vehicle start event without causing overloading or congestion on the vehicle communications bus, such as the CAN bus 104.

At step 1502, the telematics device 200 detects a vehicle start event. The vehicle start event may be an ignition event in an ICE vehicle or an EV on signal in an electric vehicle.

In response to detecting the vehicle start event, at step 1504 the telematics device 200 sends a first request for a first parameter to an electronic control unit of the vehicle. The telematics device 200 may send the first request over an interface port 102 to the vehicle communications interconnect such as the CAN bus 104.

At step 1506, the telematics device 200 receives, over the vehicle communications bus, such as the CAN bus 104, a first response containing the first parameter. Receiving the first response may comprise periodically polling the vehicle communications bus for the first response. Periodically polling the vehicle communications bus may be done at a first frequency.

At step 1508, the telematics device 200 refrains from sending a second request for a second parameter for a requests-off duration. As discussed above, the duration following the turning on event is characterized by the various ECUs 110 powering up, initializing, and requesting information from one another. As such it is desirable to minimize communicating with the various ECUs unless necessary so as not to generate much traffic on the vehicle communications bus, such as the CAN bus 104.

At step 1510, the telematics device 200 checks whether the requests-off duration, such as the duration 1010 of FIG. 10, has expired. If the requests-off duration has not expired, then control goes back to step 1508 where the telematics device 200 remains to refrain from sending further requests to other ECUs. If the requests-off duration has expired, then control goes to step 1512.

At step 1512, the telematics device 200 sends a second request for a second parameter, to an ECU 110 over the vehicle communications bus.

At step 1514, the telematics device 200 receives a second response containing the second parameter.

Advantageously, the first parameter is retrieved within a short duration since detecting the vehicle turning on event. At the same time, the vehicle communications bus is not overloaded with requests, such as the second request, until the requests-off duration has expired, the ECUs have been initialized, and there is little contention on the vehicle communications bus, such as the CAN bus 104.

In some embodiments, the first parameter is from a first set of parameters that may change in status or value after the vehicle start event and before the expiry of the requests-off duration.

In some embodiments, the first parameter comprises one or more of a parking brake status parameter, a gear status parameter, and a seatbelt status parameter.

In some embodiments, the second parameter is not from the first set of parameters.

In some embodiments, the first parameter comprises a first plurality of parameters and the first request comprises a plurality of requests sent by a first frequency of requests. The second parameter comprises a second plurality of parameters and the second request comprises a plurality of requests sent by a second frequency of requests. The second frequency of requests may be lower than the first frequency of requests.

The second parameter may include an RPM value that is greater than an idle value.

The telematics device 200 may send, over a network 50, the first parameter and the second parameter, to a telematics server 130.

It should be noted that in some instances the first response may not be received at the telematics device 200 until after the requests-off duration has expired. The arrival of the first response depends, as discussed, on the response from the ECU. The ECU may delay sending the first response until after the requests-off duration has expired. Nevertheless, the first response will arrive sooner than if the first request had been delayed until after the expiry of the requests-off duration.

It should also be noted that the requests may comprise a plurality of requests for a plurality of parameters. In this case, the requests may be sent spaced in time or with a particular frequency. However, the request of any one parameter is not delayed until the response to a previous request for another parameter is received. The plurality of requests are sent asynchronously without generally waiting for a response to one request before sending another request.

Method for Avoiding False Detection of Improper Driving Sequence

Figure 16:
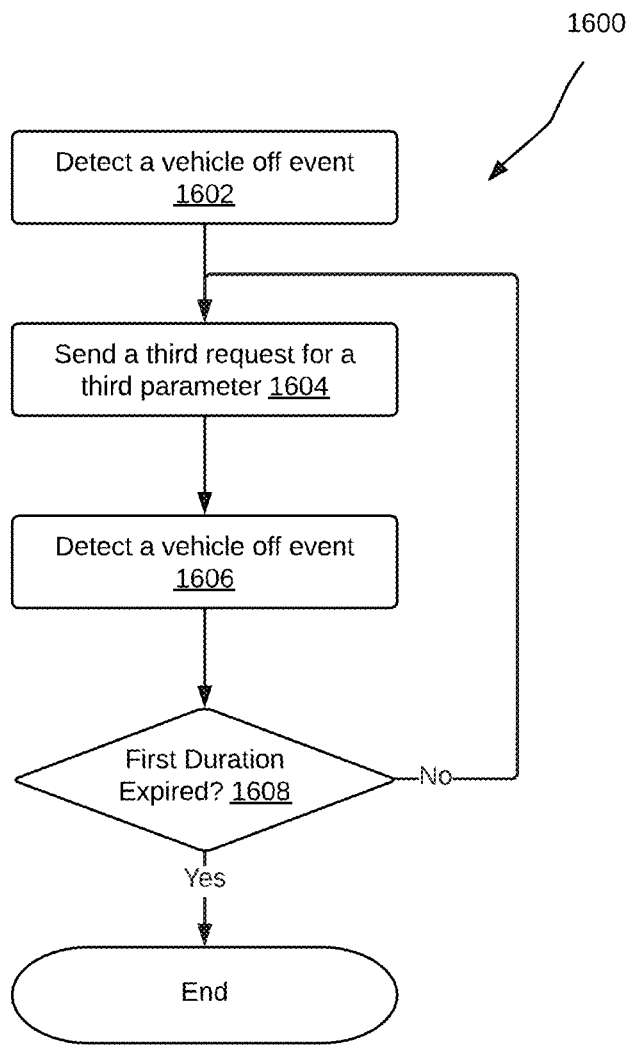
FIG. 16 is a flow chart showing a method for capturing vehicle parameters after a vehicle off event, in accordance with embodiments of the present disclosure.

In order to avoid, or at least reduce, the false detection of an improper parking sequence, a method 1600 is described with reference to FIG. 16. The method 1600 may be executed after the method 1500 of FIG. 15.

At step 1602, the telematics device 200 detects a vehicle off event. The event may be an indication that an ICE has been switched off. For example, the RPM may drop to 0 and the battery voltage may drop to an open circuit voltage. In an electric vehicle, the telematics device 200 may detect an EV OFF signal.

At step 1604, the telematics device 200 sends a third request for a third parameter during a post vehicle turning off duration that starts at the vehicle off event, such as the duration 1050 of FIG. 10. The third request for the third parameter may be similar to the first request for the first parameter.

At step 1606, the telematics device receives the third parameter.

At step 1608, the telematics device 200 checks whether the post vehicle turning off duration has expired. If the post vehicle turning off duration has not expired, then control goes back to step 1604. In doing so, the telematics device 200 may repeatedly obtain values for the third parameter and thus detect any changes therein. The method ends when the post vehicle turning off duration has expired.

The inventors have also discovered that certain ECUs 110 continue to respond to requests after the vehicle is turned off. Accordingly, parameters such as the parking brake status and the seatbelt status may be requested and obtained even after the vehicle is turned off. However, the inventors have also recognized that that repeatedly querying such ECUs 110 which continue to respond after the vehicle is turned off may deplete the vehicle's battery. Accordingly, querying ECUs 110 after the vehicle off event 1052 is only limited to a post vehicle turning off duration, shown as the duration 1050 of FIG. 10. For example the post vehicle turning off duration for which requests may be sent to some ECUs 110 after the vehicle is turned off may be as short as 30 seconds. In the depicted embodiment, the last requests sent at time 1048 is the request 1058. Subsequent to the time 1048 no further request are sent by the telematics device 200 to the ECUs 110 until the vehicle is turned back on.

As discussed above, the telematics device 200 sends telematics data to a telematics server 130. The telematics server 130 may determine whether a vehicle has followed a proper driving off sequence and/or a proper parking sequence.

Figure 17:
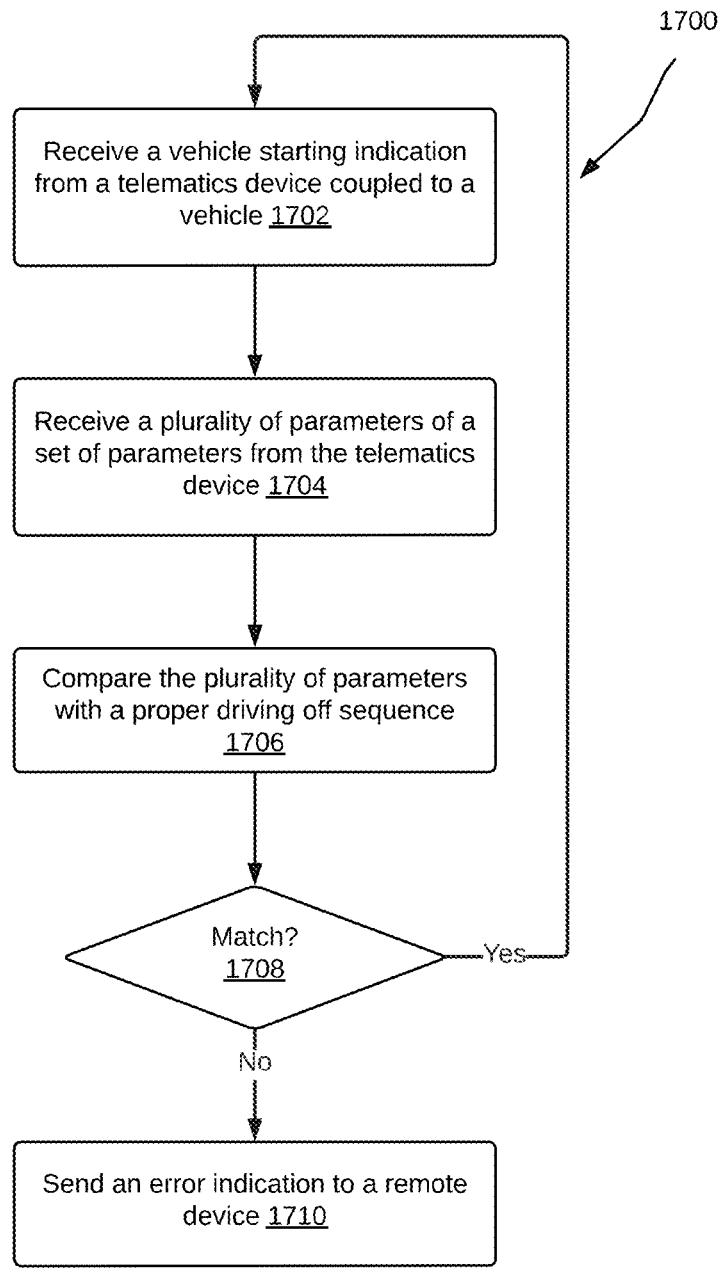
FIG. 17 is a flow chart showing a method of detecting an improper driving off sequence, in accordance with embodiments of the present disclosure.

FIG. 17 depicts a method 1700, by a server, such as the telematics server 130, in accordance with embodiments of the present disclosure. The method determines whether a vehicle has followed a proper driving off sequence and if not, sends an error indication to that effect to a remote device.

At step 1702, the server receives a vehicle starting indication from a telematics device coupled to a vehicle. The server may be the telematics server 130 of FIG. 1. The server may receive the vehicle starting indication from the telematics device over the network 50.

At step 1704, the server receives a plurality of parameters of a set of parameters, from the telematics device. The parameters may comprise one or more of a parking brake status, a gear status, and a driver's seatbelt status. The server may receive the plurality of parameters from the telematics device over the network 50.

At step 1706, the server compares the plurality of parameters received from the telematics device with a proper driving off sequence. The proper driving off sequence comprises a sequence of events corresponding to the plurality of parameters in a particular order.

At step 1708, if the plurality of parameters indicate events which are in the particular order of (i.e., match) the proper driving off sequence, then control goes back to step 1702 where the server awaits another indication of the vehicle starting. If the plurality of parameters indicate events which are not in the particular order of the proper driving off sequence, then control goes to step 1710.

At step 1710, the server sends an error indication to a remote device, the error indication indicating that the vehicle from which the plurality of parameters were gathered did not follow the proper driving off sequence of events. The remote device may be the telematics device 200 or an administration terminal 140.

Figure 18:
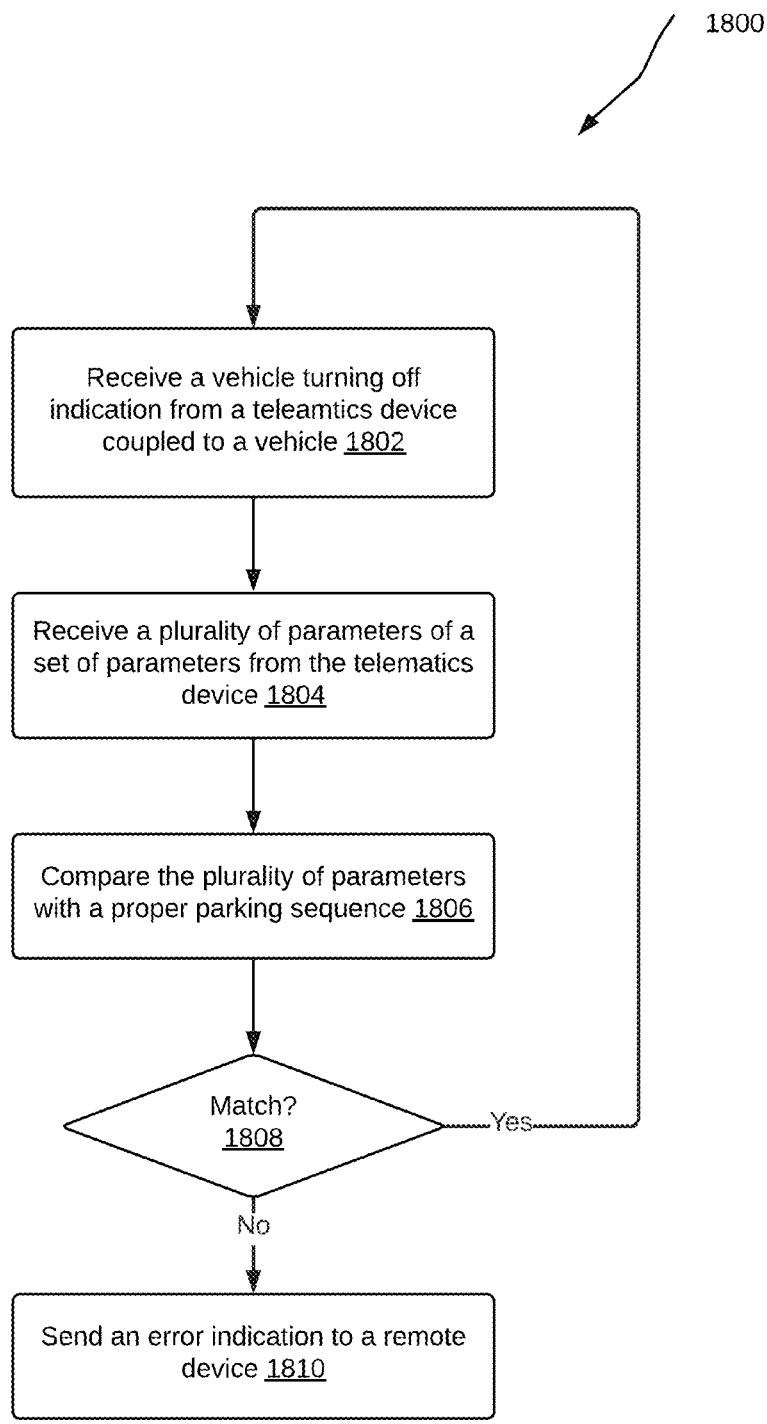
FIG. 18 is a flow chart showing a method of detecting an improper paring sequence, in accordance with embodiments of the present disclosure.

FIG. 18 depicts a method 1800, by a server, such as the telematics server 130, in accordance with embodiments of the present disclosure. The method determines whether a vehicle has followed a proper paring sequence and if not, sends an error indication to that effect to a remote device.

At step 1802, the server receives a vehicle turning off indication from a telematics device coupled to a vehicle. The server may be the telematics server 130 of FIG. 1. The server may receive the vehicle turning off indication from the telematics device over the network 50.

At step 1804, the server receives a plurality of parameters of a set of parameters, from the telematics device. The parameters may comprise one or more of a parking brake status, a gear status, and a driver's seatbelt status. The server may receive the plurality of parameters from the telematics device over the network 50.

At step 1806, the server compares the plurality of parameters received from the telematics device with a proper parking sequence. The proper parking sequence comprises a sequence of events corresponding to the plurality of parameters in a particular order.

At step 1808, if the plurality of parameters indicate events which are in the particular order of (i.e., match) the proper parking sequence, then control goes back to step 1802 where the server awaits another indication of the vehicle starting. If the plurality of parameters indicate events which are not in the particular order of the proper parking sequence, then control goes to step 1810.

At step 1810, the server sends an error indication to a remote device, the error indication indicating that the vehicle from which the plurality of parameters were gathered did not follow the proper parking sequence of events. The remote device may be the telematics device 200 or an administration terminal 140.

In FIG. 17 and FIG. 18, the proper driving off sequence and the proper parking sequence may each be specified by a fleet manager using an administration terminal 140. For example, the administration terminal 140 may send a message to the telematics server 130 specifying proper driving-off sequence and/or the proper parking sequence for a plurality of vehicles.

In some embodiments, the proper driving-off sequence and/or the proper parking sequence may be downloaded to the telematics device 200 of each of the vehicles in the plurality of vehicles. In general, a proper parameter sequence, such as a proper driving off sequence or a proper parking sequence, is a sequence or order of events that take place in a vehicle as a result of operator actions. The telematics device 200 may, at various times, compare sequences of events relating to some parameters to the proper parameter sequence corresponding to such parameters. If the telematics device 200 determines that the proper parameter sequence was not observed, the telematics device 200 may generate a notification. The notification may be in the form of an audible notification such as a voice message or a beep. The notification may also be in the form of a message sent to an operator terminal 150 of the vehicle's operator 10. In this case, the operator terminal 150 may be paired with the telematics device 200 over a short-range communications link. The notification may also be in the form of a message sent to the telematics server 130. In this case, the telematics server 130 may forward a notification to the administration terminal 140 to notify the fleet manager 140 that a proper parameter sequence was not observed by the vehicle coupled to the telematics device 200.

Figure 19:
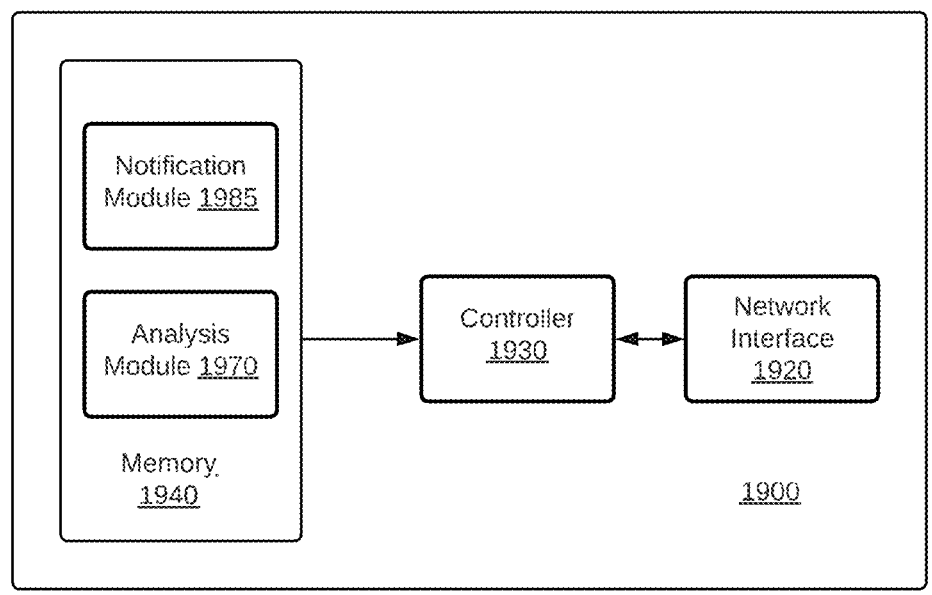
FIG. 19 is a simplified block diagram of a telematics server, in accordance with embodiments of the present disclosure.

FIG. 19 is a block diagram of a telematics server 1900 similar to the telematics server 130 of FIG. 1. The block diagram includes selected software modules which perform steps of some of the methods described in this disclosure. With reference to FIG. 19, the telematics server 1900 has a controller 1930, a network interface 1920 for connecting to the network 50, and a non-transitory memory 1940 for storing software modules. The non-transitory memory 1940 contains software modules comprised of machine executable programming instructions which when executed the controller 1930 perform steps of the methods described herein. For example, the non-transitory memory 1940 is shown to contain an analysis module 1970 and a notification module 1985. The analysis module 1970 processes the plurality of parameters received at the telematics server 1900, such as the parking brake status, the seatbelt status, and the gear status. The notification module 1985 may send notifications to the administration terminal 140 and/or the telematics device 200 as discussed with reference to FIG. 17 and FIG. 18.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in a telematics device coupled to a vehicle communications bus of a vehicle, the method comprising:
   detecting a vehicle starting event;
   in response to detecting the vehicle starting event:
      sending, over the vehicle communications bus, a first plurality of requests for a first plurality of parameters from a first set of parameters, after the vehicle starting event and before an expiry of a requests-off duration that started at the vehicle starting event, to a first plurality of electronic control units (ECUs) of the vehicle, the first set of parameters comprising a parking brake status parameter, a gear status parameter, and a seatbelt status parameter;
      receiving, over the vehicle communications bus, a first plurality of responses containing the first plurality of parameters;
      refraining from sending a second plurality of requests for a second plurality of parameters from a second set of parameters, to a second plurality of ECUs of the vehicle, for the requests-off duration;
   in response to an expiry of the requests-off duration:
      sending, over the vehicle communications bus, the second plurality of requests for the second plurality of parameters to the second plurality of ECUs of the vehicle; and
      receiving, over the vehicle communications bus, a second plurality of responses containing the second plurality of parameters.

2. The method of claim 1, wherein the first set of parameters comprises parameters that may change in status or value after the vehicle starting event and before the expiry of the requests-off duration.

3. The method of claim 1, wherein sending the first plurality of requests comprises sending the first plurality of requests at a first frequency.

4. The method of claim 1, wherein sending the second plurality of requests comprises sending the second plurality of requests at a second frequency which is lower than the first frequency.

5. The method of claim 1, wherein the second set of parameters is different from the first set of parameters.

6. The method of claim 1, further comprising:
   sending, over a network interface, the first plurality of parameters and the second plurality of parameters to a telematics server.

7. The method of claim 1, wherein the vehicle has an internal combustion engine (ICE) and detecting the vehicle starting event comprises detection an ignition event in the ICE.

8. The method of claim 1, wherein the vehicle is an electric vehicle (EV) and detecting the vehicle starting event comprises detecting an EV on signal.

9. The method of claim 1, further comprising:
   detecting a vehicle turning off event;
   in response to detecting the vehicle turning off event:
      a) sending, over the vehicle communications bus, a third plurality of requests for a third plurality of parameters from the first set of parameters after the vehicle turning off event and before an expiry of a vehicle turning off duration that started at the vehicle turning off event; and
      b) receiving, over the vehicle communications bus, a third plurality of responses containing the third plurality of parameters.

10. The method of claim 9, further comprising sending the third plurality of parameters, over a network interface, to a telematics server.

11. A telematics device for connecting with a vehicle, comprising:
    a controller;
    an asset interface coupled to the controller, the asset interface for connecting the telematics device with a vehicle communications bus of the vehicle;
    a network interface coupled to the controller;
    a memory coupled to the controller, the memory storing machine-executable programming instructions which when executed by the controller configure the telematics device to:
       detect a vehicle starting event;
       in response to detecting the vehicle starting event:
          send, over the asset interface and the vehicle communications bus, a first plurality of requests for a first plurality of parameters from a first set of parameters, after the vehicle starting event and before an expiry of a requests-off duration that started at the vehicle starting event, to a first plurality of electronic control units (ECUs) of the vehicle the first set of parameters comprising a parking brake status parameter, a gear status parameter, and a seatbelt status parameter;
          receive, over the asset interface and the vehicle communications bus, a first plurality of responses containing the first plurality of parameters;
          refrain from sending a second plurality of requests for a second plurality of parameters from a second set of parameters, to a second plurality of ECUs of the vehicle, for the requests-off duration;
       in response to an expiry of the requests-off duration, send, over the asset interface and the vehicle communications bus, the second plurality of requests for the second plurality of parameters to the second plurality of ECUs of the vehicle; and
       receive, over the vehicle communications bus, a second plurality of responses containing the second plurality of parameters.

12. The telematics device of claim 11, wherein the machine-executable programming instructions when executed by the controller further configure the telematics device to:
    detect a vehicle turning off event;
    in response to detecting the vehicle turning off event:
       a) send, over the asset interface and the vehicle communications bus, after the vehicle turning off event and before an expiry of a vehicle turning off duration, a third plurality of requests for a third plurality of parameters from the first set of parameters; and
       b) receive, over the asset interface and the vehicle communications bus, a third plurality of responses containing the third plurality of parameters.

13. The telematics device of claim 11, wherein first set of parameters may change in status or value after the vehicle starting event and before the expiry of the requests-off duration.

14. The telematics device of claim 13, wherein the second set of parameters is distinct from the first set of parameters.

15. The telematics device of claim 11, wherein the machine-executable programming instructions when executed by the controller further configure the telematics device to send, over the network interface, the first plurality of parameters and the second plurality of parameters to a telematics server.

16. The telematics device of claim 11, wherein the machine-executable programming instructions which configure the telematics device to send the first plurality of requests comprise machine-executable programming instructions which configure the telematics device to send the first plurality of requests at a first frequency.

17. The telematics device of claim 11, wherein the machine-executable programming instructions which configure the telematics device to send the send plurality of requests comprise machine-executable programming instructions which configure the telematics device to send the second plurality of requests at a second frequency which is lower than the first frequency.

18. The telematics device of claim 12, wherein the machine-executable programming instructions when executed by the controller further configure the telematics device to send, over the network interface, the third plurality of parameters a telematics server.

* * * * *